United States Patent
Vlasov

(10) Patent No.: US 9,158,393 B2
(45) Date of Patent: Oct. 13, 2015

(54) ACTIVE STYLUS FOR TOUCH SENSING APPLICATIONS

(71) Applicant: Logitech Europe S.A, Lausanne (CH)

(72) Inventor: Maxim Vlasov, Geneva (CH)

(73) Assignee: LOGITECH EUROPE S.A., Lausanne (CH)

( * ) Notice: Subject to any disclaimer, the term of this patent is extended or adjusted under 35 U.S.C. 154(b) by 31 days.

(21) Appl. No.: 14/109,840

(22) Filed: Dec. 17, 2013

(65) Prior Publication Data

US 2014/0176495 A1    Jun. 26, 2014

Related U.S. Application Data

(60) Provisional application No. 61/738,797, filed on Dec. 18, 2012, provisional application No. 61/762,222, filed on Feb. 7, 2013, provisional application No. 61/790,310, filed on Mar. 15, 2013, provisional application No. 61/791,577, filed on Mar. 15, 2013.

(51) Int. Cl.
*G06F 3/0354* (2013.01)
*G06F 3/044* (2006.01)

(52) U.S. Cl.
CPC ............ *G06F 3/03545* (2013.01); *G06F 3/044* (2013.01)

(58) Field of Classification Search
CPC .............................. G06F 3/03545; G06F 3/044
See application file for complete search history.

(56) References Cited

U.S. PATENT DOCUMENTS

| | | | |
|---|---|---|---|
| 4,476,463 A | 10/1984 | Ng et al. | |
| 4,677,428 A | 6/1987 | Bartholow | |
| 4,705,942 A | 11/1987 | Budrikis et al. | |
| 4,785,564 A | 11/1988 | Gurtler | |
| 4,794,634 A | 12/1988 | Torihata et al. | |
| 5,117,071 A | 5/1992 | Greanias et al. | |
| 5,228,352 A * | 7/1993 | McMurtry et al. | 73/865.8 |
| 5,488,204 A | 1/1996 | Mead et al. | |
| 5,568,292 A | 10/1996 | Kim | |
| 5,610,629 A | 3/1997 | Baur | |

(Continued)

FOREIGN PATENT DOCUMENTS

| EP | 0464908 A2 | 1/1992 |
|---|---|---|
| EP | 0572182 A1 | 12/1993 |

(Continued)

OTHER PUBLICATIONS

Wayne Westerman, "Hand Tracking, Finger Identification, and Chordic Manipuation of a Multi-Touch Surface", 1999.

(Continued)

*Primary Examiner* — Liliana Cerullo
(74) *Attorney, Agent, or Firm* — Patterson & Sheridan LLP.

(57) ABSTRACT

Embodiments relate generally to control devices, such as human interface devices, configured for use with a touch-screen containing device. More specifically, the present invention relates to methods and various apparatus that are used to actively control the interaction of a handheld device, such as a stylus pen, with a touch-screen containing device. Embodiments of the invention provide a universal handheld device that is able to provide input to any type of capacitive sensing touch-screen containing device, regardless of the manufacturer or, in some embodiments, without knowledge of the touch-screen containing device manufacturer's specific capacitive touch-sensing detection techniques.

19 Claims, 16 Drawing Sheets

(56) References Cited

U.S. PATENT DOCUMENTS

| | | |
|---|---|---|
| 5,659,332 A | 8/1997 | Ishii et al. |
| 5,677,744 A | 10/1997 | Yoneda et al. |
| 5,790,106 A | 8/1998 | Hirano et al. |
| 5,880,411 A | 3/1999 | Gillespie et al. |
| 5,914,708 A | 6/1999 | LaGrange et al. |
| 5,959,617 A | 9/1999 | Bird et al. |
| 6,002,387 A | 12/1999 | Ronkka et al. |
| 6,100,538 A | 8/2000 | Ogawa |
| 6,133,906 A | 10/2000 | Geaghan |
| 6,188,391 B1 | 2/2001 | Seely et al. |
| 6,323,846 B1 | 11/2001 | Westerman et al. |
| 6,441,362 B1 | 8/2002 | Ogawa |
| 6,504,530 B1 | 1/2003 | Wilson et al. |
| 6,529,189 B1 | 3/2003 | Colgan et al. |
| 6,597,348 B1 | 7/2003 | Yamazaki et al. |
| 6,603,867 B1 | 8/2003 | Sugino et al. |
| 6,667,740 B2 | 12/2003 | Ely et al. |
| 6,681,034 B1 | 1/2004 | Russo |
| 6,803,906 B1 | 10/2004 | Morrison et al. |
| 7,015,894 B2 | 3/2006 | Morohoshi |
| 7,084,933 B2 | 8/2006 | Oh et al. |
| 7,098,894 B2 | 8/2006 | Yang et al. |
| 7,372,455 B2 | 5/2008 | Perski et al. |
| 7,612,767 B1 | 11/2009 | Griffin et al. |
| 7,649,527 B2 | 1/2010 | Cho et al. |
| 7,663,607 B2 | 2/2010 | Hotelling et al. |
| 8,094,133 B2 | 1/2012 | Sato et al. |
| 8,134,542 B2 | 3/2012 | Hagen et al. |
| 8,243,041 B2 | 8/2012 | Westerman |
| 8,243,049 B2 | 8/2012 | Vos |
| 8,278,571 B2 | 10/2012 | Orsley |
| 2002/0175903 A1 | 11/2002 | Fahraeus et al. |
| 2004/0008189 A1 | 1/2004 | Clapper et al. |
| 2004/0095333 A1 | 5/2004 | Morag et al. |
| 2004/0105040 A1 | 6/2004 | Oh et al. |
| 2005/0128191 A1 | 6/2005 | Katsurahira et al. |
| 2006/0026521 A1 | 2/2006 | Hotelling et al. |
| 2006/0250381 A1 | 11/2006 | Geaghan |
| 2007/0030258 A1 | 2/2007 | Pittel et al. |
| 2008/0128180 A1 | 6/2008 | Perski et al. |
| 2008/0150658 A1 | 6/2008 | Vos |
| 2008/0150918 A1 | 6/2008 | Hagen et al. |
| 2008/0297487 A1 | 12/2008 | Hotelling et al. |
| 2008/0309625 A1 | 12/2008 | Krah et al. |
| 2009/0262637 A1 | 10/2009 | Badaye et al. |
| 2010/0013796 A1 | 1/2010 | Abileah et al. |
| 2010/0020037 A1 | 1/2010 | Narita et al. |
| 2010/0051356 A1 | 3/2010 | Stern et al. |
| 2010/0066693 A1* | 3/2010 | Sato et al. .................. 345/173 |
| 2010/0252335 A1 | 10/2010 | Orsley |
| 2010/0289754 A1 | 11/2010 | Sleeman et al. |
| 2010/0315384 A1 | 12/2010 | Hargreaves et al. |
| 2011/0043489 A1 | 2/2011 | Yoshimoto et al. |
| 2012/0013555 A1* | 1/2012 | Maeda et al. ............... 345/173 |
| 2012/0013565 A1 | 1/2012 | Westhues et al. |
| 2012/0050207 A1 | 3/2012 | Westhues et al. |
| 2012/0050231 A1 | 3/2012 | Westhues et al. |
| 2012/0068964 A1 | 3/2012 | Wright et al. |
| 2012/0177567 A1 | 7/2012 | Wayne et al. |
| 2012/0177571 A1 | 7/2012 | Watanabe et al. |
| 2012/0177573 A1 | 7/2012 | Wang et al. |
| 2012/0206330 A1 | 8/2012 | Cao et al. |
| 2012/0262407 A1 | 10/2012 | Hinckley et al. |
| 2012/0327041 A1 | 12/2012 | Harley et al. |
| 2012/0327042 A1 | 12/2012 | Harley et al. |
| 2013/0002606 A1 | 1/2013 | Mann |

FOREIGN PATENT DOCUMENTS

| | | |
|---|---|---|
| EP | 0618527 A1 | 10/1994 |
| EP | 0712090 A1 | 5/1996 |
| EP | 0 762 319 A2 | 3/1997 |
| EP | 0962881 A2 | 12/1999 |
| JP | 2000-163031 A | 6/2000 |
| WO | 97/40488 A1 | 10/1997 |
| WO | 99/22338 A1 | 5/1999 |
| WO | 2012/177571 A1 | 12/2012 |
| WO | 2012177567 A1 | 12/2012 |
| WO | 2012177573 A2 | 12/2012 |
| WO | 20130165466 A1 | 11/2013 |

OTHER PUBLICATIONS

Dean Harris Rubine, "The Automatic Recognition of Gestures", 1991.

Office Action, U.S. Appl. No. 12/327,813 dated Aug. 23, 2011.

* cited by examiner

ACTIVE STYLUS FOR TOUCH SENSING APPLICATIONS

CROSS-REFERENCE TO RELATED APPLICATIONS

This application claims benefit of U.S. Provisional Patent Application Ser. No. 61/738,797, filed Dec. 18, 2012 entitled "Electronically Augmented Pen Tip For A Touch Pad Digitizer", U.S. Provisional Patent Application Ser. No. 61/762,222, filed Feb. 7, 2013, entitled "Electronically Augmented Pen Tip For A Touch Pad Digitizer" and U.S. Provisional Patent Application Ser. No. 61/790,310, filed Mar. 15, 2013, entitled "Active Stylus For Touch Sensing Applications", and U.S. Provisional Patent Application Ser. No. 61/791,577, filed Mar. 15, 2013, entitled "Method and System for Discriminating Stylus and Touch Interactions", which are all herein incorporated by reference.

BACKGROUND OF THE INVENTION

1. Field of the Invention

The present invention relates to an apparatus and methods for actively controlling the interaction of a stylus pen with a touch-screen containing device.

2. Description of the Related Art

Touch-screen tablet computers allow a user the ability to interact directly with content displayed on the touch-screen of the tablet computer. These interactions can be conducted through various means, but typically are done through touch, by way of the user's fingers directly interacting with the screen, or through the use of a stylus pen or other type of input control device that contacts the screen based on movements made by the user. Touch-screens are generally adapted to recognize a position of the touch event on the touch sensor panel at a desired moment in time, and an attached computing system then uses the collected touch event data to control one or more operations based on the received touch event data. A finger, stylus pen or other interacting object are sensed so that various functions can be performed by the touch-screen tablet computer. Most conventional touch-screens are adapted to interpret the various touches supplied by either a finger, stylus pen or other object, either individually or as a single gesture, in accordance with the display appearing at the time of the touch event, and thereafter can perform one or more actions based on the touch event.

Typically, touch-screens distinguish touch inputs from stylus pen inputs by use of various conventional sensing technologies (e.g., optical pens and optical sensors) or by use of input modes that require the user to select a certain type of input device based on the operations the user wants to conduct on the touch-screen of the tablet computer. Other typical solutions require stylus pen inputs to originate from a stylus pen that is physically tethered to the tablet computer. Physically tethered stylus pens require some electrical and physical integration with touch-screen tablet computer, and are often inconvenient to handle and can easily fail due to wear on the connecting components that tether the stylus pen to the touch-screen tablet computer.

A touch-sensing signal output from a touch-screen can be a composite signal, for example, that includes one or more signals caused by a touch and one or more signals caused by other sources, such as electrical interference, which does not provide information about the touch interaction. These other sources, or error sources, can cause a change in the operation of touch sensing that causes the portion of the touch sensing signal that carries touch information to inaccurately reflect the amount or position of the touch.

FIG. 1 is a schematic view of a portion of a mutual capacitance sensing type touch-screen containing device, generally referred to herein as a host device 100, that is used to sense the position of a conductive input object, such as a finger 115 over a user interface 104 portion (i.e., a touch screen) of the host device 100. The host device 100 generally includes the user interface 104, a driver assembly 113 (which may also be referred to herein as a "column driver") and sensing assembly 117. A mutual capacitance based touch system can include, for example, drive regions and sense regions, such as drive electrodes 114 and sense electrodes 116. For example, drive electrodes 114a-114c (generally oriented in the x-direction) can be formed in rows while sense electrodes 116a-116b (generally oriented in the y-direction) can be formed in columns. Touch-sensing areas, or touch pixels, can be formed at regions where the drive electrode 114 and the sense electrode 116 overlap or are adjacent to each other. A mutual capacitance $C_M$ is formed between the drive electrode 114 and sense electrode 116 at a touch pixel. During operation, the drive electrodes 114 may be stimulated with a waveform by driver assembly 113. Because the value of mutual capacitance $C_M$ may be too small to be precisely measured during a small window of time (e.g., during a single scan cycle of user interface 104), the driver assembly 113 may typically send a series of pulses via the mutual capacitance $C_M$, that may be integrated and measured at the sensed capacitance Cs in the sensing assembly 117. As a conductive input object approaches the touch pixel, some of the charge being coupled between the row and column of the touch pixel can instead be coupled onto the conductive input object, thus forming an input object capacitance $C_F$. It is well known in the art that the interaction and coupling of the conductive input object, such as a finger or large stylus pen, will cause a charge accumulated in a sensed capacitance Cs in the sensing assembly 117 to decrease, compared with the charge at a sensed capacitance Cs when no conductive input object interacts with the drive and sensing electrodes of the user interface 104. This reduction in charge coupling across the touch pixel can result in a net decrease in the measured mutual capacitance $C_M$ between the drive electrode and the sense electrode and a reduction in the waveform being coupled across the touch pixel. This reduction in the charge-coupled waveform can be detected and measured by analyzing the change in the sensed capacitance $C_s$ in the sensing assembly 117 to determine the positions of multiple objects when they touch the user interface 104. In some embodiments, a user interface 104 can be a touch-screen of any of the following types: multi-touch, single touch, projection scan, full-imaging multi-touch, or any other capacitive touch.

To provide touch sensing capability using a stylus pen, typically a tip of a conventional stylus pen has been sized so that the capacitive sensing components in the touch screen device can sense the tip when it contacts the surface of the touch screen. Thus, the tip of the stylus pen is large enough to interfere with the electric field lines created between the drive and sense electrodes of the touch screen device. As such, conventional styluses are passive input devices in that they are incapable of actively altering the input received by the capacitive sensing components in the touch screen or sensing a touch-induced capacitance change in a capacitive touch sensor panel when it is desired to input touch related information.

Despite the progress made with respect to operating touch-screen tablet computers, there is a need in the art for improved methods and apparatus related to an active stylus pen that is configured to provide input to any type of touch-screen tablet computer in spite of the problems discussed above.

SUMMARY OF THE INVENTION

Embodiments of the invention generally relate to a control device, such as a human interface device, configured for use with a touch-screen containing device. More specifically, the present invention relates to methods and apparatuses that are used to actively control the interaction of a handheld device, such as a stylus pen, with a touch-screen containing device. Embodiments of the invention provide a universal handheld device that is able to provide input to any type of capacitive sensing touch-screen containing device, regardless of the manufacturer or, in some embodiments, without knowledge of the touch-screen containing device manufacturer's specific capacitive touch-sensing detection techniques.

Embodiments may provide a stylus adapted for use with a touch sensing device, comprising a conductive tip, a peak signal detector and a phase discriminator that are each electrically coupled to the conductive tip, and a controller that is configured to receive a signal from the peak signal detector and a signal from the phase discriminator, wherein the signals from the peak detector and the phase discriminator are based on a capacitive sensing signal generated by the touch sensing device.

Embodiments may further provide a stylus adapted for use with a touch sensing device, comprising a conductive tip, an amplifier, a controlling capacitor disposed in series between the conductive tip and the amplifier, a switching device electrically connected between a ground and a portion of an electrical connection formed between the controlling capacitor and the amplifier, a controller having one or more data inputs, and two or more comparators that are each configured to separately receive a capacitive sensing signal received by the conductive tip, and deliver data to the one or more data inputs of the controller.

Embodiments may further provide a stylus adapted for use with a touch sensing device, comprising a conductive tip, a phase discriminator electrically coupled to the conductive tip, a waveform generator, a controller configured to receive data from the phase discriminator and deliver a generator controlling signal to the waveform generator based on the received data, and a power amplifier configured to deliver a capacitive sensing controlling signal to the conductive tip based on an output of the waveform generator, wherein the output of the waveform generator is based on the generator controlling signal.

Embodiments may further provide a stylus adapted for use with a touch sensing device, comprising a conductive tip, a memory unit configured to store a first data set, wherein the first data set comprises information relating to a process that is performed by at least one type of touch sensing device, a controller configured to receive data from the conductive tip and compare the received data with the first data set, and a generator assembly configured to deliver a capacitive sensing controlling signal to the conductive tip, wherein the capacitive sensing controlling signal is derived from the comparison of the received data and the first data set performed by the controller.

Embodiments may further provide a method of providing input to a touch sensing device, comprising receiving a capacitive sensing signal from a conductive tip of a stylus pen, comparing the received capacitive sensing signal with a first data set, wherein the first data set comprises characteristics of a capacitive sensing process performed by at least one type of touch sensing device, and delivering a capacitive sensing input signal to the conductive tip, wherein the capacitive sensing input signal is derived from the comparison of the received capacitive sensing signal and the first data set.

Embodiments may further provide a method of providing input to a touch sensing device, comprising receiving capacitive sensing signal from the touch sensing device using a conductive stylus pen tip, wherein the received capacitive sensing signal is received during a cyclical scan of a touch sensing surface performed by the touch sensing device, and comprises a first data set collected over a first time interval of the cyclical scan and a second data set collected over a second time interval of the cyclical scan, comparing a first data set and the second data set to determine if the magnitude of the capacitive sensing signal in the first data set is different than the magnitude of the capacitive sensing signal in the second data set, and delivering an amount of charge to the stylus pen tip during the first time interval when the comparison determines that the magnitude of the capacitive sensing signal in the first data set is different than the capacitive sensing signal of the second data set.

Embodiments may further provide a method of providing input to a touch sensing device, comprising receiving capacitive sensing signal from the touch sensing device using a conductive stylus pen tip, wherein the received capacitive sensing signal is received during a cyclical scan of a touch sensing surface performed by the touch sensing device, and comprises a first data set collected over a first time interval of the cyclical scan and a second data set collected over a second time interval of the cyclical scan, comparing a first data set and the second data set to determine if the quality of the first data set is higher than the quality of the second data set, and delivering an amount of charge to the stylus pen tip during the first time interval when the comparison determines that the quality of the first data set is higher than the quality of the second data set.

Embodiments may further provide a method of providing input to a touch sensing device, comprising receiving capacitive sensing signal from the touch sensing device using a conductive stylus pen tip that is coupled to a first input of a controlling capacitor, wherein the received capacitive sensing signal is received during a cyclical scan of a touch sensing surface performed by the touch sensing device, detecting the amplitude of the received capacitive sensing signal using a detection process, wherein the detection process comprises (a) connecting a second input of the controlling capacitor to ground for a first period of time, (b) charging the controlling capacitor to the pen tip drive level using the output waveform generator, (c) disconnecting the second input of the controlling capacitor from ground for a second period of time, (d) starting the measurements of the charge variation on the second input of the capacitor by means of the amplifier, and (e) repeating steps (a)-(d) at least two times during a cycle of the cyclical scan process performed by the touch sensing device, determining a time during the cycle of the cyclical scan process performed by the touch sensing device a first measured voltage is different than a second measured voltage, wherein the first and the second measured voltages are each determined during different second periods of time during the cycle of the cyclical scan process, and delivering an amount of charge to the conductive stylus pen tip when the determined time during a cycle of the cyclical scan process occurs.

Embodiments may further provide a method of providing input to a touch sensing device, comprising receiving a capacitive sensing signal from the touch screen device using a conductive tip of a stylus pen, wherein the capacitive sensing signal comprises N number of pulses provided at a first frequency, and N is an integer greater than 1, and delivering a capacitive sensing controlling signal to the conductive tip while receiving the capacitive sensing signal, wherein the capacitive sensing controlling signal comprises M number of pulses provided at a second frequency, and wherein M is less than N and the second frequency is greater than the first frequency.

Embodiments may further provide a non-transitory computer-readable medium storing program instructions that, when executed by a processing unit, cause the processing unit to deliver data to a touch sensing device by performing the steps of receiving capacitive sensing signal from a conductive tip of a stylus pen, comparing the received capacitive sensing signal with a first data set, wherein the first data set comprises characteristics of a capacitive sensing process performed by at least one type of touch sensing device, and delivering a capacitive sensing controlling signal to the conductive tip, wherein the capacitive sensing controlling signal is derived from the comparison of the received capacitive sensing signal and the first data set.

Embodiments may further provide a non-transitory computer-readable medium storing program instructions that, when executed by a processing unit, cause the processing unit to deliver data to a touch sensing device by performing the steps of receiving capacitive sensing signal from the touch sensing device using a conductive stylus pen tip, wherein the received capacitive sensing signal is received during a cyclical scan of a touch sensing surface performed by a touch sensing device, and comprises a first data set collected over a first time interval of the cyclical scan and a second data set collected over a second time interval of the cyclical scan, comparing a first data set and the second data set to determine if the quality of the first data set is higher than the quality of the second data set, and delivering an amount of charge to the stylus pen tip during the first time interval when the comparison determines that the quality of the first data set is higher than the quality of the second data set.

Embodiments may further provide a non-transitory computer-readable medium storing program instructions that, when executed by a processing unit, cause the processing unit to deliver data to a touch sensing device by performing the steps of receiving capacitive sensing signal from the touch sensing device using a conductive stylus pen tip, wherein the received capacitive sensing signal is received during a cyclical scan of a touch sensing surface performed by a touch sensing device, and comprises a first data set collected over a first time interval of the cyclical scan and a second data set collected over a second time interval of the cyclical scan, comparing a first data set and the second data set to determine if the magnitude of the capacitive sensing signal in the first data set is different than the magnitude of the capacitive sensing signal in the second data set, and delivering an amount of charge to the stylus pen tip during the first time interval when the comparison determines that the magnitude of the capacitive sensing signal in the first data set is different than the capacitive sensing signal of the second data set.

Embodiments may further provide a non-transitory computer-readable medium storing program instructions that, when executed by a processing unit, cause the processing unit to deliver data to a touch sensing device by performing the steps of receiving a capacitive sensing signal from the touch screen device using a conductive tip of a stylus pen, wherein the capacitive sensing signal comprises N number of pulses provided at a first frequency, and wherein N is an integer greater than 1 and the first frequency is greater than or equal to any other frequency contained in the capacitive sensing signal, and delivering a capacitive sensing controlling signal to the conductive tip while receiving the capacitive sensing signal, wherein the capacitive sensing controlling signal comprises M number of pulses provided at a second frequency, and wherein M is less than N and the second frequency is greater than the first frequency.

Embodiments may further provide a non-transitory computer-readable medium storing program instructions that, when executed by a processing unit, cause the processing unit to deliver data to a touch sensing device by performing the steps of receiving capacitive sensing signal from the touch sensing device using a conductive stylus pen tip that is coupled to a first input of a controlling capacitor, wherein the received capacitive sensing signal is received during a cyclical scan of a touch sensing surface of the touch sensing device, detecting the amplitude of the received capacitive sensing signal using a detection process, wherein the detection process comprises (a) connecting a second input of the controlling capacitor to ground for a first period of time, (b) charging the controlling capacitor to the pen tip drive level using the output waveform generator, (c) disconnecting the second input of the controlling capacitor from ground for a second period of time, (d) starting the measurements of the charge variation on the second input of the capacitor by means of the amplifier, and (e) repeating steps (a)-(d) at least two times during a cycle of the cyclical scan process performed by the touch sensing device, determining a time during a cycle of the cyclical scan process performed by the touch sensing device a first measured voltage is different than a second measured voltage, wherein the first and the second measured voltages are each determined during different second periods of time during the cycle of the cyclical scan process, and delivering an amount of charge to the conductive stylus pen tip when the determined time during a cycle of the cyclical scan process occurs.

BRIEF DESCRIPTION OF THE DRAWINGS

So that the manner in which the above recited features of the present invention can be understood in detail, a more particular description of the invention, briefly summarized above, may be had by reference to embodiments, some of which are illustrated in the appended drawings. It is to be noted, however, that the appended drawings illustrate only typical embodiments of this invention and are therefore not to be considered limiting of its scope, for the invention may admit to other equally effective embodiments.

Figure 1:
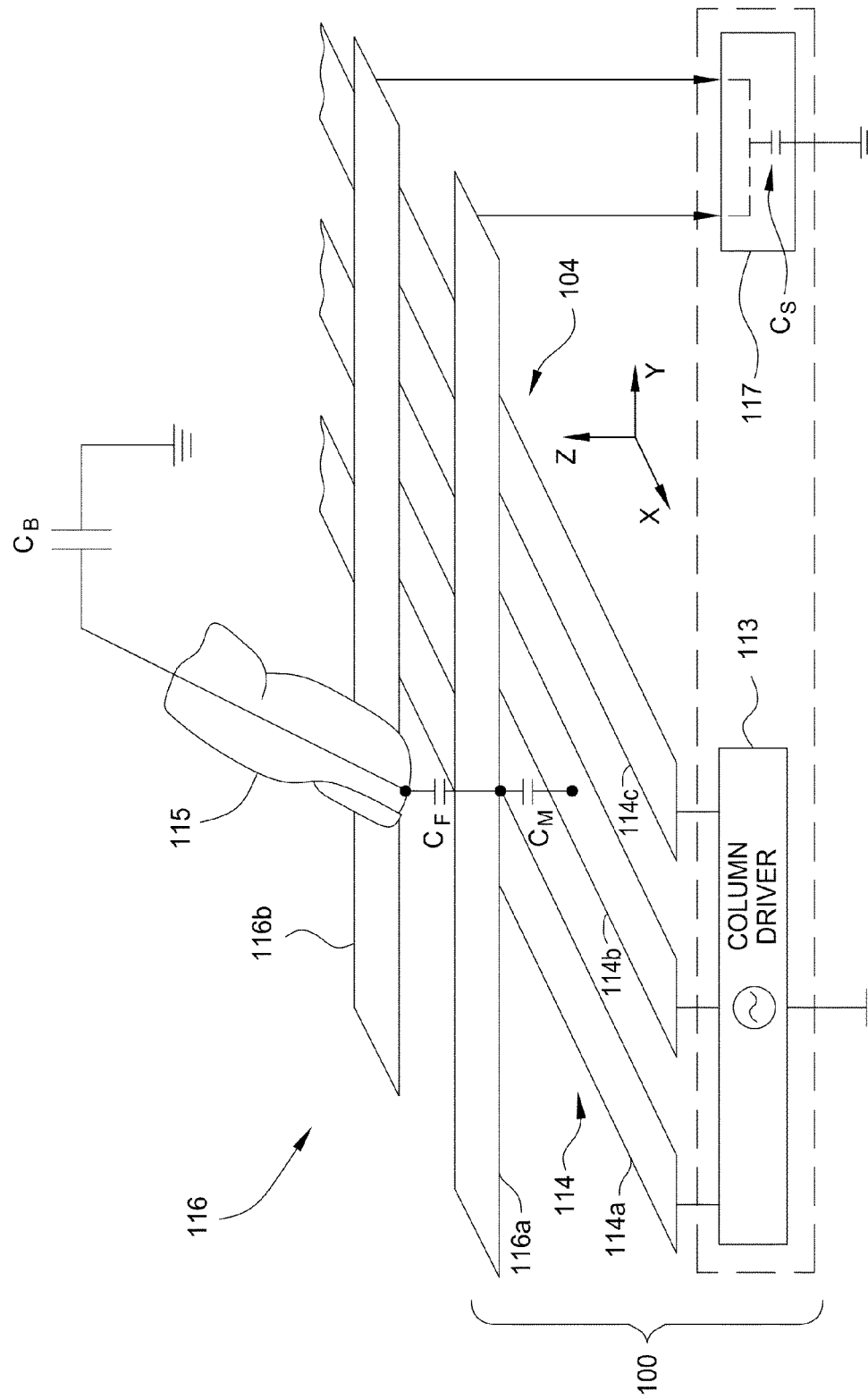
FIG. 1 illustrates a portion of a conventional mutual capacitance sensing type host device.

To facilitate understanding, identical reference numerals have been used, where possible, to designate identical elements that are common to the figures. It is contemplated that elements disclosed in one embodiment may be beneficially utilized on other embodiments without specific recitation. The drawings referred to here should not be understood as being drawn to scale unless specifically noted. Also, the drawings are often simplified and details or components omitted for clarity of presentation and explanation. The drawings and discussion serve to explain principles discussed below, where like designations denote like elements.

DETAILED DESCRIPTION

Embodiments of the invention generally relate to methods and apparatuses that are used to actively control the interaction of a handheld device with a touch-screen containing device, such as a touch-screen tablet computer. Embodiments of the invention provide a universal handheld device that is able to provide input to any type of capacitive sensing touch-screen containing device, regardless of the manufacturer or, in some embodiments, knowledge of the touch-screen containing device manufacturer's specific capacitive touch-sensing detection techniques. In general, the handheld device disclosed herein is an electronic stylus pen, or also referred to herein as simply a "stylus pen," that a user uses to provide input to control some aspect of the touch sensitive device. In some configurations, the "stylus pen" includes an "active stylus pen" that is configured to actively alter the capacitive sensing signal generated by the touch sensing components in the touch-screen containing device, so that an active portion of the active stylus pen, such as its tip, is sensed as a input object by the touch screen containing device. In general, the active portion of the stylus pen is sized so that it is physically smaller than the touch screen can detect so that the electronic components in the stylus pen can selectively control whether the input of the stylus pen is sensed by the touch screen.

Computing devices that provide software applications that allow a user to input information via a touch input mechanism and a stylus pen input mechanism are often complex due to the need to distinguish between the interaction of a user's appendage, finger and stylus pen with the touch sensitive device to properly control some aspect of the hardware or software applications running on the computing device. It is common for the software applications running on the computing device to assign different tasks or cause different computing device controlling events to happen based on the input received from either a stylus pen, a finger or an appendage. Errors in the proper selection of an inputting element will create errors in the output generated by the software running on the host device, which will understandably frustrate the user even if they are an uncommon occurrence. Moreover, improper selection errors can also cause significant disruption to the task that the user is performing on the computing device.

Embodiments of the invention described herein may also include a system and methods that employ a controlling engine running on a touch-screen containing device, generally referred to herein as a host device, to discern between the user input received from a stylus pen, fingers or user's appendage. The data generated from the controlling engine's analysis of the user input data received from the various components that are coupled to or in communication with the touch-screen containing device can then be used to control some aspect of the hardware or software running on the touch sensitive containing device. The controlling engine generally includes software instructions that include one or more input discrimination techniques that are used to analyze the various types of user input data received from one or more components in the touch sensitive device to determine the likely source of the user input.

Figure 2A:
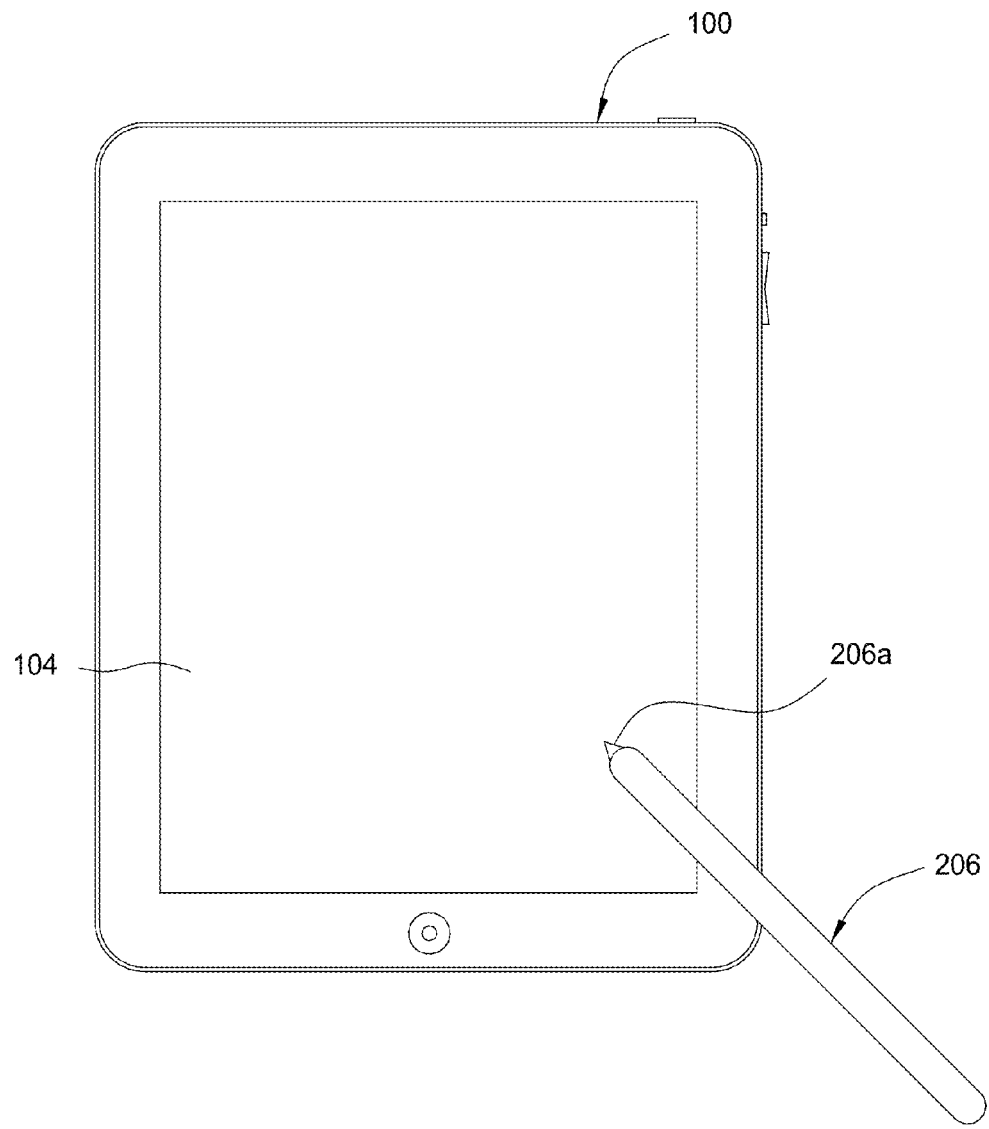
FIG. 2A illustrates an exemplary touch-screen tablet computer and a capacitive stylus pen, according to an embodiment of the invention.

In FIG. 2A, a system is depicted that includes a touch-sensitive computing device, or host device 100, that includes a user interface 104. Host devices 100 that include a user interface 104 may be capable of user interaction through a touch-screen sensing component. The host device 100 may be, for example, general computing devices, phones, media players, e-reader, kiosks, notebooks, netbooks, tablet types of computers, or any other device having one or more touch-sensitive inputs. In some devices, the user interface 104 can include components that are used to display applications being executed by the host device 100. In the example shown in FIG. 2A, the host device 100 is an electronic device such as an iPad® device from Apple Inc. Exemplary embodiments of computing devices include, without limitation, the iPhone®, iPad® and iPod Touch® devices from Apple Inc., the Galaxy Note® 10.1 from Samsung, the Surface™ from Microsoft, other mobile devices, tablet computers, desktop computers, kiosks, and the like. FIG. 2A also depicts an active stylus pen 206 that is capable of interacting with host device 100 through the user interface 104. Active stylus pen 206 may be configured with a pen tip 206a to allow the user interface 104 to sense input from the active stylus pen 206.

Figure 2B:
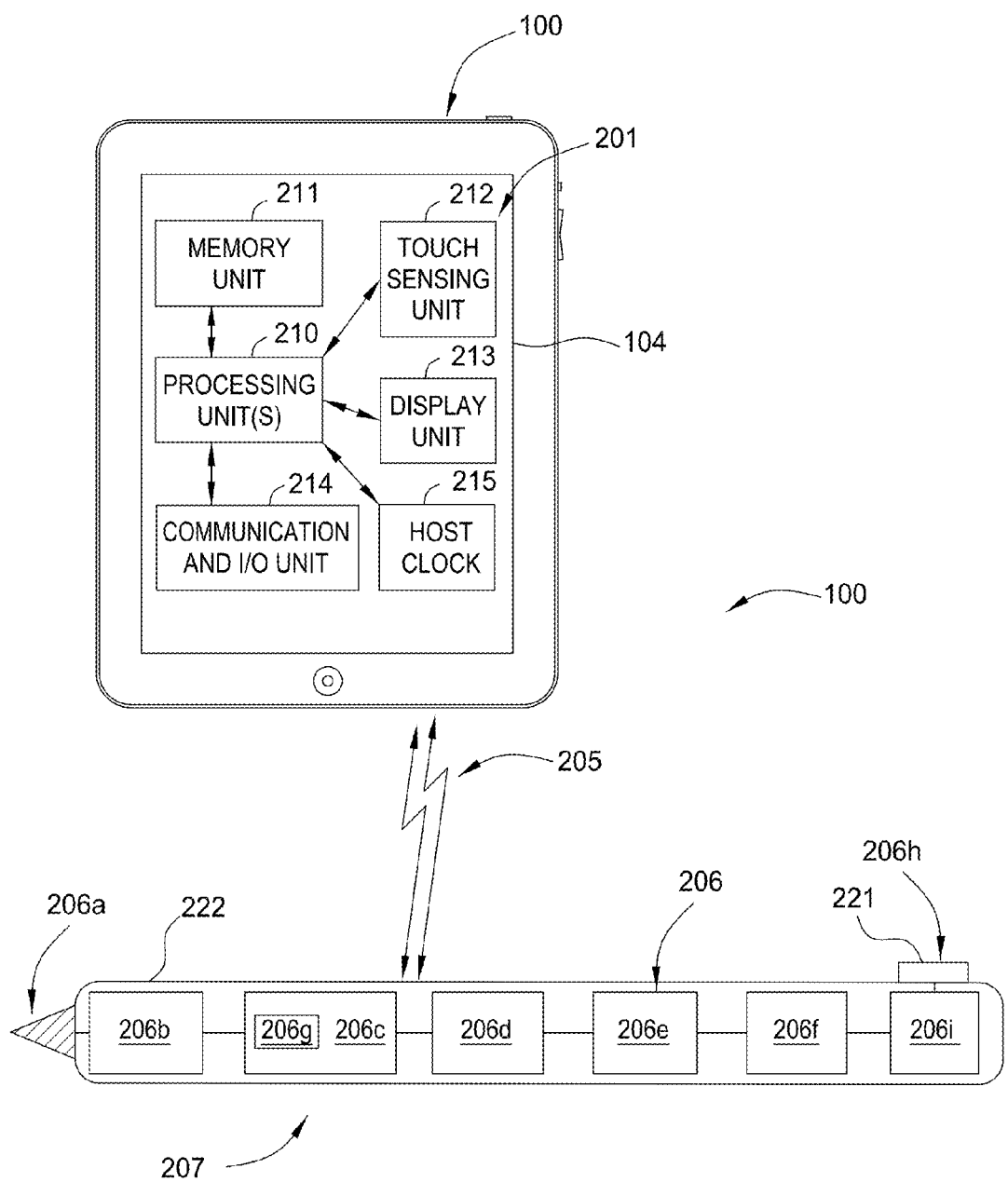
FIG. 2B is a simplified block diagram of the components of a host device and stylus pen, according to an embodiment of the invention.

FIG. 2B schematically illustrates a system diagram showing a simplified view of the control elements of a host device 100, and a simplified system diagram of the control elements of an active stylus pen 206. The host device 100 typically has at least some minimum computational capability, touch sensing capability and/or visual display capability. The host device 100 includes processing components 201 that may include, but is not limited to one or more processing units 210, a memory unit 211, a touch sensing unit 212, a display unit 213 and a communications unit 214. The touch sensing unit 212 generally uses mutual capacitance types of touch sensing techniques, but may also utilize resistive, absolute sensing types of capacitive sensing, acoustic or other similar sensing and signal processing components, which are known in the art, to sense the input received from a user at the user interface 104. The touch sensing unit 212 may be disposed within and/or coupled to the user interface 104 in the host device 100. The display unit 213 may include various components that are able to display and/or visually render information provided to it by the one or more processing units 210 and memory unit 211. The display unit 213 may include any type of visual interface that includes light emitting diode (LED), organic LED (OLED), liquid crystal display (LCD), plasma, electroluminescence (EL), or other similar conventional display technology. The communications unit 214 will generally include one or more components that are configured to transmit and receive information via a communication link 205 between the host device 100, the active stylus pen 206 and other possible peripheral devices via a desirable communication method. A desirable communication method may include a wireless communication method, such as a Bluetooth Low Energy (BLE) communication method, Classic Bluetooth, WiFi, or other similar near-field communication (NFC) method, and may also include proprietary wireless communications methods. The memory unit 211 generally contains computer readable media that can be accessed by the host device 100 and may include both volatile and nonvolatile media for storage of information, such as computer-readable or computer-executable instructions, data, programs and/or other data. Memory unit 211 may include computer or machine readable media or storage devices such as DVD's, CD's, floppy disks, tape drives, hard drives, optical drives, solid state memory devices, RAM, ROM, flash memory or any other device which can be used to store the desired information.

To allow the host device 100 to discriminate between the various inputs received from the user, the device should have a sufficient computational capability and system memory to enable basic computational operations. As illustrated by FIG. 2B, the computational capability can be completed by one or more processing unit(s) 210 that are in communication with memory unit 211. The processing unit(s) 210 may include conventional central processing units (CPUs), which include graphical processing units (GPU) and other useful elements to control the various display, touch, communication and other units in the host device 100. The processing unit(s) 210 may also include or be in communication with a host clock 215, which may be a simple IC or similar component that aids in the analysis and synchronization of data transferred between components in the host device and/or data transferred between the host device 100 and other connected wired and wireless network components (e.g., active stylus pen 206).

In some embodiments, the active stylus pen 206 may have one or more active regions that are able to collect additional information about the user's interaction with the host device 100. In one example, the one or more active regions may include an active tip of the active stylus pen 206 that is positioned so that the user will cause this region of the active stylus pen 206 to interact with the host device 100. The active tip of the active stylus pen 206 may contain sensors that are able to measure some aspect of the interaction of the active tip and the host device 100. As schematically depicted in FIG. 2, the active stylus pen 206 may include a pen tip 206a, a pressure sensing unit 206b, a processor 206c, a communications unit 206d, a memory unit 206e, a power source 206f and a clock 206g. In some embodiments, the active stylus pen 206 may further comprise one or more additional sensors (not shown in FIG. 2B), such as one or both of a gyroscope and an accelerometer.

Referring back to FIG. 2A, the pen tip 206a is configured to make contact with the user interface 104 of the host device 100. The pressure exerted at the pen tip 206a is dependent on the user's interaction with the active stylus pen 206. The pressure sensing unit 206b is capable of detecting the amount of pressure applied to the pen tip 206a of the active stylus pen 206 by the user. Pressure data corresponding to the amount of pressure exerted by the user with the user interface 104 of the host device 100 is measured by the pressure sensing unit 206b. The pressure data can include data from a binary switch, or other device that is able to discern between 8, 16, 32, 64, or any other desirable number of pressure levels so that the generated pressure data is useful for the control of the host device 100. In embodiments of the invention, different pressure levels can be used for different host devices 100, such that an active stylus pen interaction will only be registered by the host device 100 when a threshold pressure level is detected. In some embodiments, the pressure data sensed by the pressure sensing unit 206b may also include an analog measurement of the pressure applied, and thus the generated pressure data supplied to the host device 100 may vary continuously across a desired range.

The processor 206c can be configured to control the operation of the active stylus pen 206. The active stylus pen 206 may be comprised of one or more processors to control various aspects of the operation of the active stylus pen 206. The processor 206c may also include or be in communication with an clock 206g, which may be a simple IC or similar component that aids in the analysis and synchronization of data transferred between components in the active stylus pen 206 and/or data transferred between the active stylus pen 206 and other wired and wireless network components (e.g., host device 100).

The communications unit 206d is capable of transmitting the pressure data from the active stylus pen 206 to the communications unit 214 of the host device 100 when active stylus pen interactions are made against the user interface 104 of the host device 100. In some embodiments of the invention, the communications unit 206d transmits the interaction data via a desirable wireless communication method, such as a Bluetooth low energy (BTLE) communication method. Other embodiments include other appropriate communications device components for transmitting interaction data between the active stylus pen 206 and the host device 100. Interaction data supplied by the active stylus pen 206 can comprise the pressure data, timing data, and/or orientation data generated from gyroscopes or accelerometers or the like in the active stylus pen 206. In some embodiments, the communications unit 206d may only transmit the pressure data once a threshold pressure level has been detected by the pressure sensing unit 206b. In other embodiments, the communications unit 206d may transmit the pressure data from the active stylus pen 206 once any pressure is detected, regardless of the pressure level detected by the pressure sensing unit 206b.

The memory unit 206e is capable of storing data related to the active stylus pen 206 and data related to the host device 100, such as device settings and host clock 215 and clock 206g information. For example, the memory unit 206e may store data related to the linking association between the active stylus pen 206 and the host device 100.

In some embodiments, the active stylus pen 206 may access host device identification information relating to one or more host devices 100. The information may include data relating to physical characteristics or capacitive sensing techniques of each of the different types of host devices, and may be stored in memory unit 206e or retrieved from a source through communications link 205. The host device identification information may further include frequency, timing and phase information of a detected signal, the number of rows and/or columns in the user interface 104 and other useful information. The host device identification information may be pre-programmed and/or stored in memory based on host device vendor specifications or may be learned (i.e., through use of the active stylus pen 206 with particular host devices 100) and then stored in memory unit 206e or transmitted to a communicatively coupled device through communications link 205.

The power source 206f is capable of providing power to the active stylus pen 206. The power source 206f may be a built-in battery inside the active stylus pen 206. The power source 206f can be electrically coupled to one or more of the components within the active stylus pen 206 in order to supply electrical power to the active stylus pen 206.

As noted above, some embodiments of the active stylus pen 206 may be comprised of one or both of a gyroscope, an accelerometer, or the like. A gyroscope is a device configured to measure the orientation of the active stylus pen 206 and operates based on the principles of the conservation of angular momentum. In certain embodiments, one or more gyroscopes are micro-electromechanical (MEMS) devices configured to detect a certain rotation of the active stylus pen 206. To illustrate, the active stylus pen 206 can be configured to send orientation data from a gyroscope contained within the active stylus pen 206. This orientation data can be used in conjunction with the timing and pressure data communicated from the active stylus pen 206 to the host device 100. In certain embodiments, the accelerometers are electromechanical devices (e.g., micro-electromechanical systems (MEMS) devices) configured to measure acceleration forces (e.g., static and dynamic forces). One or more accelerometers can be used to detect three-dimensional (3D) positioning. For example, 3D tracking can utilize a three-axis accelerometer or two two-axis accelerometers. According to some embodiments, the active stylus pen 206 may utilize a 3-axis accelerometer to detect the movement of the active stylus pen 206 in relation to the user interface 104 of the host device 100.

Active Stylus Pen and Active Pen Control Techniques

Referring back to FIG. 2B, in one embodiment, the active stylus pen 206 may include a touch signal generating device (TSGD) 206h that is used to cause the active stylus pen 206 to be selectively sensed by the capacitive sensing elements found within the touch sensing unit 212 of the user interface 104 of the host device 100. In this configuration, touch signal generating device 206h includes one or more components that are able to selectively alter a measured mutual capacitance between a portion of the pen tip 206a and the capacitive sensing elements found in the user interface 104 when a TSGD switch, such as a mechanical sensor/switch 221 is activated by the user. In one example, the TSGD switch is part of the pen tip 206a or pressure sensing unit 206b. The altered measured mutual capacitance between the pen tip 206a and the host device 100 creates a touch event that is sensed by the user interface 104 with or without the physical act of touching the pen tip 206a to the user interface.

In one embodiment, the touch signal generating device 206h includes signal control electronics 206i, a conductive coating 222 formed on a surface of the active stylus pen 206, which the user is in contact with when they are holding the active stylus pen 206, and the mechanical sensor/switch 221 (e.g., simple mechanical switch). In one embodiment, the signal control electronics 206i generally includes a signal generating device and other supporting components that are able to inject a current through the pen tip 206a to the capacitive sensing elements in the user interface 104 at an interval that is synchronized with the capacitive sensing signals delivered between the capacitive sensing elements in the user interface 104. The signal control electronics 206i, which is able to detect the capacitive sensing signal(s) delivered by the transmitter electrodes to the receiver electrodes in the touch sensing unit 212 at any instant in time, may also contain a phase shifting device (not shown in FIG. 2B) that is able to synchronize the timing of the injection of current through the pen tip 206a with the delivery of the capacitive sensing signal(s) delivered between the nearest transmitter and receiver electrodes. In one embodiment, the mechanical sensor/switch 221 when activated electrically couples the conductive coating 222, signal control electronics 206i and other useful electrical components in the active stylus pen 206 to the pen tip 206a to create a signal capable of altering a measured mutual capacitance that is delivered between then pen tip 206a and the capacitive sensing elements in the user interface 104. The signal created by the activation of the mechanical sensor/switch 221 can at least be intermittently applied between the pen tip 206a and a portion of the user interface 104, so that a desirable touch signal is received by the user interface 104 with or without the physical act of touching the pen tip 206a to the user interface.

Figure 3A:
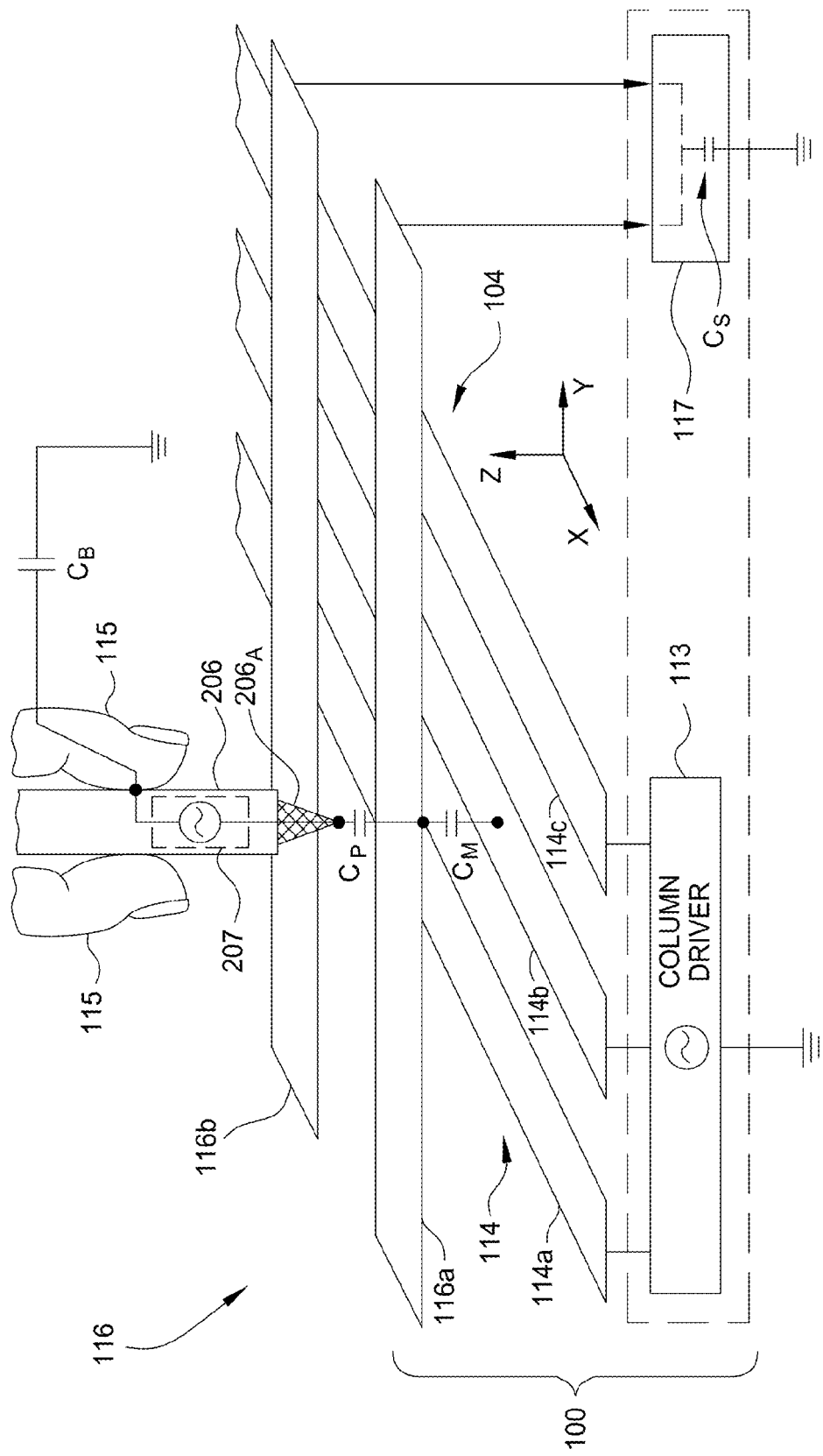
FIG. 3A is an isometric cross-sectional view of a portion of a mutual capacitance sensing type host device that is interacting with an active stylus pen, according to an embodiment of the invention.

FIG. 3A is an electrical schematic that illustrates the operation of an active stylus pen 206 with a host device 100 that is configured for mutual capacitance sensing, according to an embodiment of the invention. The active stylus pen 206 is configured with an active stylus control element 207, which may receive signals from host device 100 as well as generate signals to be transmitted to the host device 100. As shown, the active stylus pen 206 may be held by a user's fingers 115 and is coupled to the user interface 104 through pen tip 206a. The active stylus pen 206 may be physically coupled to the user interface 104, or the active stylus pen 206 may be located in proximity to the user interface 104 such that signals generated within the active stylus control element 207 and transmitted to the pen tip 206a are able to change the sensed capacitance at sensing assembly 117 to a desired level at a desired time.

The host device 100, of which a portion is depicted in FIG. 2A, generally includes a user interface 104, a driver assembly 113 and a sensing assembly 117. The user interface 104 may include, for example, drive regions and sense regions, such as drive electrodes 114 and sense electrodes 116. Further, the drive electrodes 114a-114c (x-direction) may be formed in columns while sense electrodes 116a-116b (y-direction) may be formed in rows. Touch sensing areas, or touch pixels, may be formed at the overlapping regions of the drive electrodes and sense electrodes. The user interface 104 may also sense touch at regions where the drive electrodes and sense electrodes do not overlap, and further may use a combination of multiple touch sensing areas to determine a touch location.

During operation, column driver 113 may transmit a capacitive sensing waveform on one or more drive electrodes 114 at a time, thereby creating a mutual capacitance $C_M$ between the row of sense electrodes 116 and the driven drive electrode(s) 114 (i.e., column(s)) at each touch pixel. Active stylus pen 206, when coupled to the user interface 104, may be configured to detect the transmitted capacitive sensing waveform. When active stylus pen 206 is coupled to the user interface 104, some of the charge coupled between the drive electrodes 114 and sense electrodes 116 corresponding to one or more touch pixels may instead be coupled onto the active stylus pen 206, thus forming a pen capacitance $C_P$ corresponding to each of the coupled touch pixels. More charge may generally be coupled from a particular touch pixel to the active stylus pen 206 where the active stylus pen 206 is a shorter distance from that touch pixel; therefore, detecting that more charge has been coupled away from a particular touch pixel may indicate a shorter distance to active stylus pen 206. This reduction in charge coupling across the touch pixels can result in a net decrease in the measured mutual capacitance $C_M$ between the drive electrode 114 and the sense electrode 116, and a reduction in the capacitive sensing waveform being coupled across the touch pixel. This reduction in the charge-coupled sensing waveform can be detected and measured by analyzing the change in the sensed capacitance $C_s$ in the sensing assembly 117 to determine the positions of multiple objects when they touch the user interface 104.

In some embodiments, the active stylus pen 206 may send a controlling signal to the user interface 104 by injecting a charge at the appropriate time to the pen tip 206a, which alters the measured mutual capacitance $C_M$ and thus the value of sensed capacitance $C_s$ detected by the sensing assembly 117. Therefore, by controlling the amount of charge to a desired level, or voltage formed between the pen tip 206a and a sense electrode 116 to a desired level, the pen tip 206a of the active stylus pen 206 can be detected by the capacitive sensing element in the touch-screen containing host device 100 as being a touch event.

Further, in some embodiments the active stylus pen 206 may detect a signal produced at one or more drive electrodes 114 of the touch-screen containing device by the column driver 113. Based on the detected signal, the active stylus pen 206 may alter the sensed capacitance $C_s$ to a level at a desired time, so as to cause the touch-screen containing device to correctly determine the location of input provided by the active stylus pen 206. Advantageously, since the size of the pen tip 206a is generally too small to be sensed by the user interface 104, the active stylus pen 206 may therefore be used to selectively provide a touch sensing input to the user interface 104. Therefore, by timing when a user input is provided by the active stylus pen 206 to the user interface 104, the software running on the touch-screen containing device 200 can analyze and use the provided input to control some aspect of a software program running on the touch-screen containing device 200 and/or display some aspect of the input received on the display portion of the touch-screen device 200. In some embodiments, the active stylus pen 206 is adapted to deliver input from the active stylus pen 206 to any type of touch-screen containing device, despite differences in the particular configurations and sensing methods preformed by the touch-screen containing devices.

In some embodiments, the active stylus control element 207 may be able to identify an absolute position of the coupling of pen tip 206a with the user interface 104, along at least one dimension (i.e., columns) of the user interface 104. Advantageously, identifying the absolute position may allow host device 100 to identify the presence of multiple inputs to the user interface 104, and to further discriminate the signals provided by these multiple inputs. To identify the absolute position of the coupling, active stylus control element 207 may determine the nearest column to the coupling by sensing the signal detected at pen tip 206a during one or more scan cycles of user interface 104. Generally, determining a maximum amplitude of the detected signal indicates that the column driver 113 signal is being applied to a column that is nearest to the pen tip 206a. To determine the total number of columns of user interface 104, active stylus control element 207 may access host device identification information corresponding to host device 100 that indicates the number of columns; alternately, active stylus control element 207 may estimate the number of columns based on determining the amount of time that the nearest column is being driven and determining the amount of time of a scan cycle. For example, suppose that active stylus control element 207 detects that the scan cycle lasts 16 milliseconds (ms) (corresponding to a 60 Hz display frequency), that a column is driven for 0.2 ms (i.e., 200 microseconds) and that the column driver 113 spends an equal length of time driving each column. The active stylus control element 207 could estimate that user interface 104 has 80 columns.

Periodic events may generally provide reference timing by which the absolute position of the coupling of pen tip 206a with the user interface 104 may be calculated. In some embodiments, the host device 100 may transmit to user interface 104 a periodic pulse at the beginning or end of each scan cycle. This periodic pulse may thus be used to indicate the start time of a scan cycle. For example, the periodic pulse may recalibrate the drive electrodes 114 and/or the sense electrodes 116 by eliminating any residual charge on the electrodes, or may estimate any charge leakage. The active stylus control element 207 may determine the length of a scan cycle by measuring the time between consecutive periodic pulses, and may further determine the absolute position of pen tip 206a by measuring the time from the beginning of the scan cycle (i.e., detecting a periodic pulse) to the time when the nearest column to pen tip 206a is being driven. The absolute x-coordinate (relating to columns) position may then be transmitted to the host device via the communication link 205, so that this information can be used by and/or compared with the touch sensing coordinate information received from the host device 100 to help more easily determine which touch data points are related to the stylus pen 106.

Figure 3B:
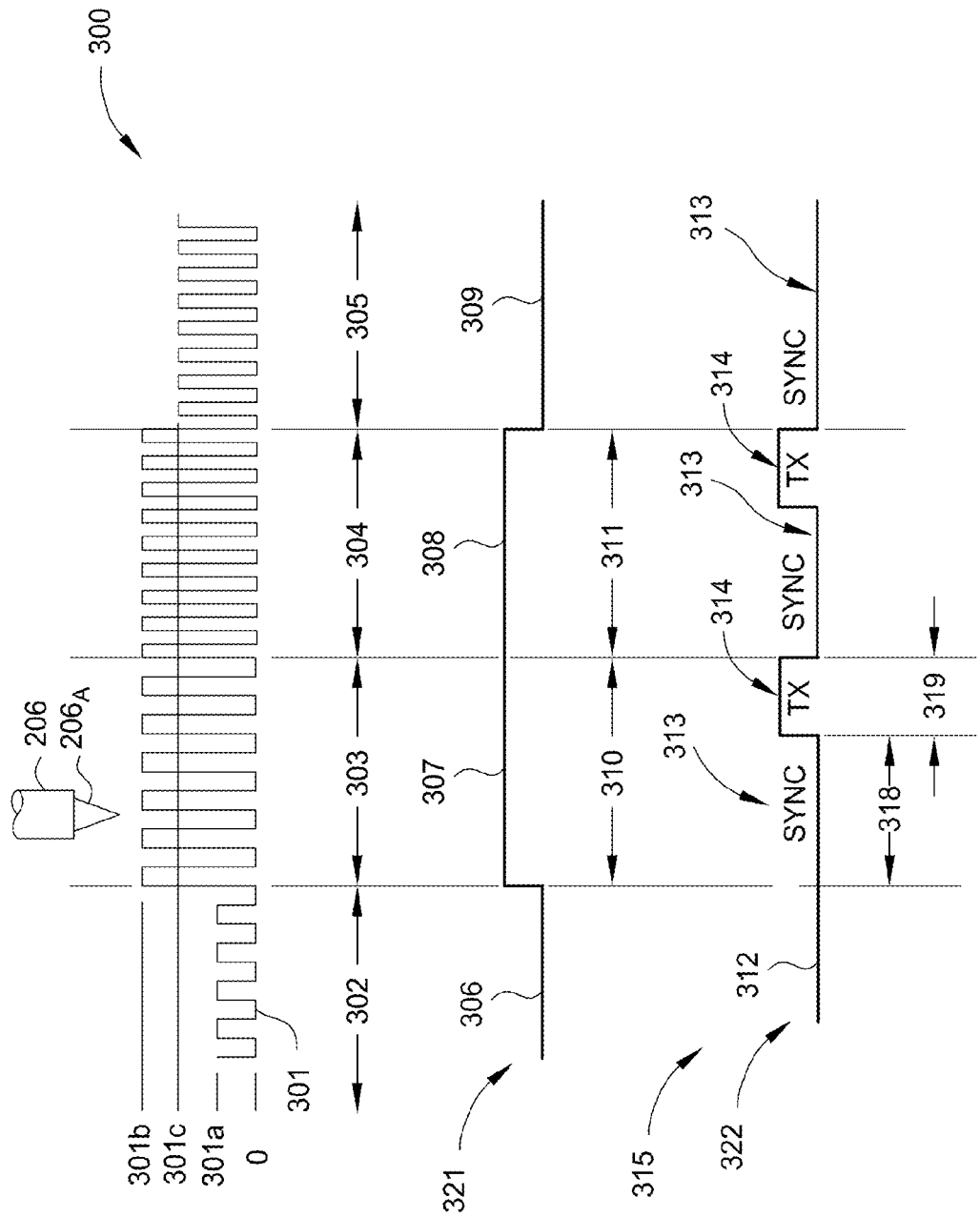
FIG. 3B is a schematic signal diagram illustrating aspects of the process of detecting a touch-sensing device output signal and synchronizing an active stylus pen thereto, according to an embodiment of the invention.

FIG. 3B generally illustrates a driven touch-sensing detected signal 301 provided by the touch sensing components in the host device 100 and two different types of controlling signals, such as controlling signal 321 and controlling signal 322, that are generated and provided to the pen tip 206a by the active stylus control element 207, according to an embodiment described herein. To provide desirable user input the active stylus control element 207 may generally operate in a synchronization mode 313 or in a transmit mode 314.

For example, assume that active stylus pen 206 is coupled to a particular touch-screen containing host device 100. The location of the pen tip 206a on the touch screen may be directly at a drive pixel that contains a portion of the drive electrode 114 (i.e., a column) and the sense electrode 116 (i.e., a row), but may also be located on the touch screen between drive pixels. Detected signal 301 represents the voltage measured by the pen tip 206a over time. Detected signal 301 reflects a signal that is generated by the column driver 113 and then sequentially applied to each column as the user interface 104 is sequentially scanned. The active stylus control element 207 may operate by default in synchronization mode 313, essentially listening for signal activity in this mode, then may transition to transmit mode 314 based on signal activity received and processed by the processor 206c.

During time period 302, detected signal 301 has a signal magnitude 301a, which indicates that the column driver 113 signal is being applied to a column that is a distance away from the pen tip 206a, such as a neighboring column, and thus has not yet reached the column nearest to the pen tip 206a. The active stylus control element 207 may remain in a synchronization mode 313 for a period of time or until the signal magnitude changes. During the next time periods 303 and 304, detected signal 301 has an amplitude of 301b, indicating that the column driver 113 is currently applying a portion of the detected signal 301 to a column (e.g., drive electrode 114) that is closer to the pen tip 206a than the column that delivered the signal during the time period 302.

Generally, synchronization of the active stylus control element 207 with the touch-screen containing host device 100 is important to ensuring accurate input is detected by the host device 100. For example, suppose the active stylus control element 207 transmits a signal to pen tip 206a when column driver 113 is driving a column at a distance from where the pen tip 206a is located. The signal transmitted to pen tip 206a will change the sensed capacitance most strongly at a sensing assembly 117 closest to the location of pen tip 206a, but may also affect nearby sensing assemblies 117 to a lesser degree. Because the host device 100 may measure the values of sensed capacitance across all rows simultaneously, but the columns may be driven in particular sequence, the host device 100 will detect the changes in sensed capacitance but may misinterpret the location of the input. The effect of the misinterpretation may be erratic or erroneous input into host device 100, which may cause the input position on the screen to jump around and/or lead to other undesirable effects in programs being executed on host device 100, and may further significantly degrade the user's experience.

To provide more accurate input from the active stylus pen 206 to host device 100, in one or more embodiments the active stylus control element 207 may transmit an output signal to pen tip 206a when the active stylus control element 207 determines or estimates that the column driver 113 is driving a column at or within a certain distance from the location of the coupling of pen tip 206a to the touch sensing components in the host device 100. For example, the active stylus control element 207 may choose to transmit an output signal to pen tip 206a when column driver drives the single nearest column to the coupling, or the three nearest columns to the coupling (i.e., the single nearest column, one column to the left, and one column to the right), or any suitable number of columns that allows sufficient resolution for the sensing assemblies 117 of host device 100 to accurately sense the output transmitted by pen tip 206a.

In some embodiments, the host device 100 may detect a location of its coupling with the pen tip 206a by determining the sensing assembly 117 having the highest sensed signal, or by interpolating the signals sensed at a plurality of sensing assemblies 117. As described above, the columns of host device 100 may be driven in particular sequence, but the host device 100 may measure the values of sensed capacitance across all rows simultaneously. Further, the user interface 104 may determine a touch using a combination of multiple touch sensing areas. And because having the pen tip 206a couple relatively more charge to a first sensing assembly 117 than to a second sensing assembly 117 generally indicates the pen tip 206a is a shorter distance from the first sensing assembly 117, the respective amounts of charge coupled to the plurality of sensing assemblies 117 may be compared to determine a location of the pen tip 206a. In determining a location of the pen tip 206a, some embodiments may determine a centroid (also called a "geometric center" or "center of mass") based on the amounts of charge coupled to the plurality of sensing assemblies 117. At the next time period 304, the frequency of detected signal 301 received from the host device 100 may be changed, and may be a higher or lower frequency than the portion of the detected signal 301 in time period 303. The change in frequency may be caused by the particular scanning process of host device 100. In this example, the frequency of detected signal 301 increases at time period 304 while the amplitude of detected signal 301 remains at a signal magnitude 301b, indicating that the detected signal 301 is still being applied to the same or similarly positioned column to pen tip 206a. In one or more configurations, the active stylus control element 207 may adapt to such a change in frequency and adjust the output signal delivered from the pen tip 206a. To accomplish this, the active stylus control element 207 may stop transmitting and transition from transmit mode 314 to synchronization mode 313. When the active stylus control element 207 regains synchronization with detected signal 301, the active stylus control element 207 may then return to transmit mode 314 and resume transmitting an output signal 312 to the pen tip 206a.

At subsequent time period 305, the magnitude of detected signal 301 decreases from 301b to 301c, indicating that the column driver 113 is applying the detected signal 301 to a column (i.e., the column driver 113 is transmitting on the next column) that is a distance away from the column(s) that delivered the signal during the time periods 303 and 304. If active stylus control element 207 is configured to transmit only on the single nearest column, this indication that the nearest column is no longer delivering the detected signal 301 from column driver 113 may cause the active stylus control element 207 to transition into synchronization mode 313, irrespective of the frequency or phase of detected signal 301 that is detected by the active stylus pen 206. However, if active stylus control element 207 is configured to transmit on two or more nearest columns, this indication may or may not cause active stylus control element 207 to transition into synchronization mode 313. Although detected signal 301 is depicted as having the same frequency and phase during time period 305 as during time period 304, the example is meant to demonstrate that the signal magnitude falling below a particular threshold may trigger a transition into synchronization mode 313, regardless of signal frequency or phase. Further, the examples disclosed herein are not meant to be limiting the claimed subject matter to only those embodiments interacting with host devices 100 that generate such signal patterns, frequencies, phases, or changes in frequencies and/or phases.

In one or more embodiments, the signal magnitude value(s) that correspond to column driver 113 driving one or more nearest columns (i.e., magnitudes 301a-c) may be learned during one scan cycle. The signal magnitude values may then be used to determine a threshold value that can effectively distinguish the maximum magnitude value, or one or more largest magnitude values, from the remainder of detected signal magnitude values (i.e., distinguish magnitude 301b from magnitudes 301a and 301c). In subsequent scan cycles, the threshold value may be compared with the detected signal magnitude to indicate whether column driver 113 is currently driving at one or more nearest columns to pen tip 206a.

In one embodiment, when the sensing component (e.g., communications unit 206d, the processor 206c and the memory unit 206e) of the active stylus pen 206 determines that the nearest column(s) are delivering the column driver 113 signal, the sensing component may analyze the detected signal 301 and generate an output signal based on the detected signal 301. The active stylus control element 207 may remain in synchronization mode 313 for a time period 318, when analysis of the detected signal 301 is complete and the active stylus control element 207 has synchronized to the detected signal 301. The active stylus control element 207 may then transition into transmit mode 314 and begin transmitting an output signal, such as the output signal 307, 308, or 314 found in the transmit modes of the controlling signal 321 or 322 to the pen tip 206*a*. Transmission may continue until synchronization with the detected signal 301 is lost (e.g., if the frequency or phase of detected signal 301 changes), or until the magnitude of detected signal falls below a determined threshold value indicating that column driver 113 is no longer delivering the signal at the nearest column(s).

Though active stylus control element 207 may be capable of on-the-fly adaption to a frequency change in a detected signal 301, this adaptive capability may have a significant computational expense. This expense may have secondary effects of increasing the power consumption of active stylus pen 206 as the active stylus control element 207 more frequently processes the detected signal 301 and attempts to synchronize, as well as decreasing the percentage of time during scan cycles that the active stylus control element 207 is able to transmit to host device 100. For example, active stylus control element 207 is depicted as being in synchronization mode 313 for a longer time period 318 than the time period 319, during which active stylus control element 207 is in transmit mode 314. Such a decreased percentage may result in a less responsive input to the host device 100, which may ultimately cause computing errors in host device 100.

In another embodiment, however, the active stylus pen 206 may accommodate longer transmit mode time periods 319 by accessing host device identification information relating to one or more host devices 100. If the active stylus pen 206 already contains host device identification information corresponding to the particular host device 100, the active stylus pen 206 may advantageously bypass synchronization mode 313 when column driver 113 is driving detected signal 301 on the nearest column(s). In other words, active stylus pen 206 may transmit an output signal to the pen tip 206*a* during the entirety of time periods 310 and 311 (as depicted by signal 307 and 308). Further, frequency and phase changes to detected signal 301 may not disrupt the transmission by the active stylus pen 206 if the target frequency and phase values are also included in the host device identification information.

Figure 3C:
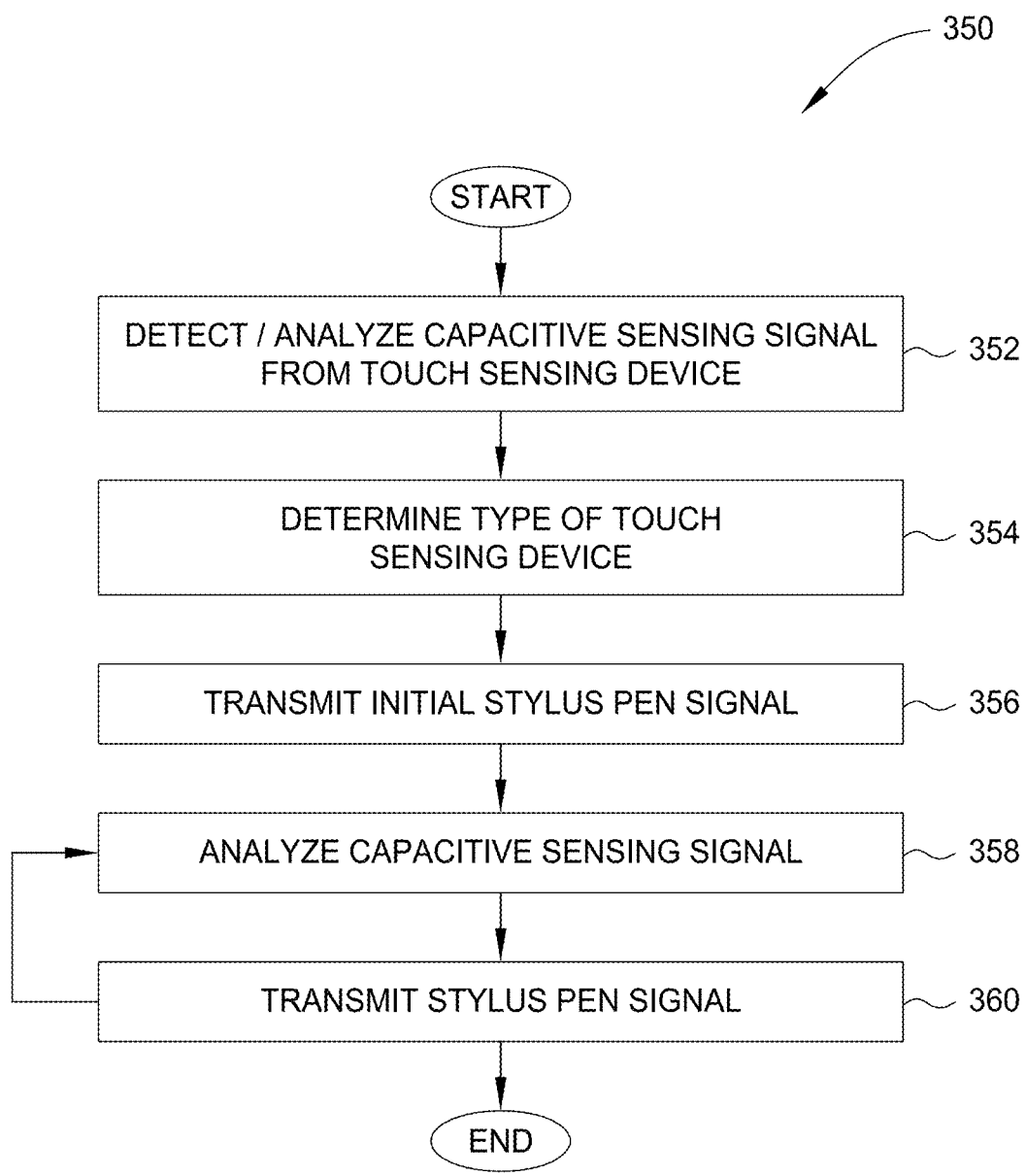
FIG. 3C is a flowchart illustrating a method of detecting a touch-sensing device output signal and synchronizing an active stylus pen thereto, according to an embodiment of the invention.

The method of detecting an output signal of a touch-screen containing device and synchronizing the active stylus control element 207 to the output signal is further described in the flowchart of FIG. 3C. The method 350 begins at block 352, where the active stylus control element 207, through a pen tip 206*a* detects a capacitive sensing detected signal 301 that has been transmitted by the touch-sensing host device 100. The detected signal 301 may be generated by column driver 113 and applied to the one or more drive electrodes 114, which is then sensed by pen tip 206*a*. The active stylus pen 206 may analyze the detected signal 301 using processor 206*c* and memory unit 206*e*. In one or more embodiments, the active stylus control element 207 may operate in synchronization mode 313 while detecting and analyzing the detected signal 301.

At block 354, the active stylus control element 207 determines the type of touch-sensing host device 100 using the detected signal 301 and host device identification information stored in memory unit 206*e*. In one or more embodiments, the active stylus control element 207 may continue to operate in synchronization mode 313 while determining the type of host device 100 that the active stylus pen 206 is interacting with currently. The active stylus control element 207 may specifically identify the vendor and model of the host device 100 by comparing the signature of the detected signal 301 to host device identification information stored in memory unit 206*e*. Having determined the specific host device 100, at block 356 the active stylus control element 207 transmits an initial stylus pen signal to pen tip 206*a* that affects the sensed capacitance of the host device 100. The active stylus control element 207 may enter transmit mode 314 to begin transmitting to the host device 100 to wake-up the host device 100, for example. In one embodiment, after determining the type of host device 100 from analyzing the detected signal 301 and knowing the host device's physical attributes and/or scanning techniques from information stored in memory unit 206*e*, the active stylus pen 206 may alter or adjust all of the future controlling signals delivered to the pen tip 206*a* by the active stylus control element 207, so that they better conform to the specific touch sensing technique(s) performed by the host device 100 and so the communication of the input data from the active stylus pen 206 is improved.

The signals generated by the active stylus control element 207 and delivered to the pen tip 206*a* may be in phase with detected signal 301, or may be out of phase, depending upon the configuration of host device 100 that is interacting with active stylus control element 207. In one example, the host device 100 is configured to detect touch-screen input by receiving a signal at the sensing assembly 117 that is in phase with the signal generated at column driver 113. In another example, the host device 100 is configured to receive a signal at sensing assembly 117 that lags the generated touch sensing signal provided by the host device by 180° (e.g., the signals are 180° out of phase with one another).

After transmitting the initial stylus pen signal, the active stylus pen 206 at block 358 may return to synchronization mode 313 and analyze the detected signal 301 being transmitted by host device 100. Based on the analysis, the active stylus pen 206 at block 360 may enter transmit mode 314 and again transmit a stylus pen signal to host device 100. This cycle between blocks 358 and 360 may continue repeating until the active stylus pen no longer receives a detected signal 301 from the host device 100. Such a disruption in the signal may be caused by a user moving the active stylus pen 206 so that it no longer couples with the host device 100, a loss of power from the power source 206*f*, by turning off host device 100, or any other factor or combination of factors that might generally disrupt a signal transmission.

In another embodiment, after the active stylus pen 206 completes an initial configuration with the host device 100 (i.e., the active stylus pen 206 has initially detected and analyzed the detected signal 301 at block 352, detected the type of host device 100 at block 354, and transmitted an initial stylus pen signal to host device 100 at block 356), the active stylus pen 206 may cycle between blocks 358 and 360 substantially concurrently, i.e., the active stylus pen 206 may transmit stylus pen signals to host device 100 at substantially the same time as receiving the output detected signal 301.

Active Stylus Pen Configuration Examples

Figure 4:
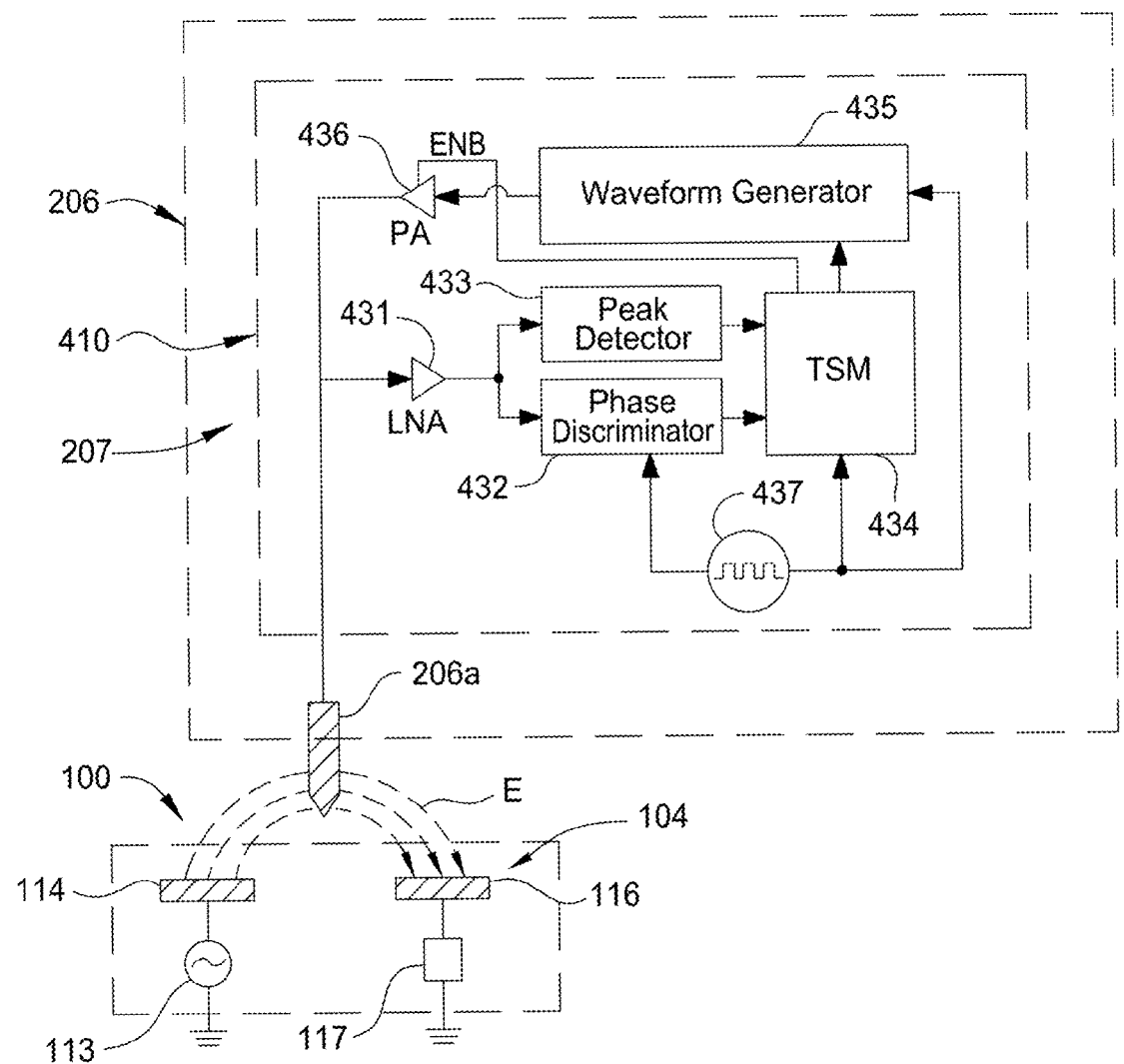
FIG. 4 is a schematic diagram of an active stylus pen interacting with a mutual capacitance sensing type host device, according to an embodiment of the invention.

FIG. 4 illustrates the components of an active stylus pen 206 capable of interacting with a host device 100 that is configured for mutual capacitance sensing, according to an embodiment of the invention. The active stylus pen 206 may couple to the host device 100 through pen tip 206*a*, as discussed above. The active stylus pen 206 is further configured with an active stylus control element 410, which comprises a low-noise amplifier (LNA) 431, a phase discriminator 432, a peak detector 433, a timing state machine (TSM) 434, a waveform generator (WG) 435, a power amplifier (PA) 436, and a clock source 437. The LNA 431 generally provides linear signal amplification, and in one or more configurations, LNA 431 may provide a passband of 10 kilohertz (kHz) to 1 megahertz (MHz) frequencies prior to amplification; signal frequencies that fall outside the passband will be attenuated and not amplified. One or more configurations of LNA 431 may also have an input impedance in the range of 1-100 megaohms (MO). The phase discriminator 432 is generally a zero-crossing detector, which generates a pulse having a width of one cycle of clock source 437 upon detecting a transition of potential at pen tip 206a. The peak detector 433 is generally comprised of rectifier, integrator, and low pass filter components. The TSM 434 is comprised of a state machine that controls mode selection, a phase and frequency estimator, a calibration state machine, and a timing sequencer through use of the processor 206c, clock 206g and memory unit 206e. Output generated by TSM 434 provides control to the WG 435, which may generate an appropriate sequence of square pulses having a particular frequency, amplitude and duty cycle that are specified by TSM 434. The PA 436 drives the pen tip 206a so that a desired signal can be detected by the host device 100, and is capable of tri-state operation based on control signals received from TSM 434 and WG 435. In one example, the tri-state operation, which may be controlled by the TSM 434, may include the delivery of a high voltage signal ($V_H$) (e.g., positive voltage signal) and a low voltage signal ($V_L$) (e.g., negative voltage signal) to provide a desired signal from the pen tip 206a that can be sensed (e.g., $V_H$ or $V_L$) at desired times by any type of host device 100 using any type sensing technique. The PA 436 may also deliver no signal at all to pen tip 206a such as during idle periods or while the PA 436 is in a high-impedance mode (e.g., when active stylus control element 410 is synchronizing to a detected signal 301). The clock source 437 may be a crystal oscillator or a comparably precise source, and is typically the same clock as clock 206g discussed above. The clock source 437 is generally required to be as precise as the clock source that drives the user interface 104. The host device 100 generally includes a user interface 104, a driver assembly 113 and a sensing assembly 117. Touch sensing areas, or touch pixels, may be formed at the overlapping regions of the one or more drive electrodes 114 and one or more sense electrodes 116. As shown, pen tip 206a is located within an electric field E of the mutual capacitance created by the drive electrode 114 and sense electrode 116. In this configuration, the pen tip 206a is coupled to the user interface 104, and the signals generated within the active stylus control element 410 and transmitted to the pen tip 206a may alter the electric field E, which in turn may change the sensed capacitance at sensing assembly 117 to a desired level at a desired time.

According to an embodiment of the invention, active stylus control element 410 may generally operate in a synchronization mode and/or in a transmit mode. The active stylus control element 410 may operate by default in synchronization mode, essentially listening for signal activity of the touch sensing component in the host device 100 in this mode, then may transition to transmit mode based on received signal activity. To operate in synchronization mode, the TSM 434 may transmit an output to the enable (ENB) input of PA 436, which causes the PA 436 to operate in a high impedance mode and deliver the signal to the pen tip 206a at a desired time to coincide with the capacitive sensing signal delivered by the host device 100. The high impedance at PA 436 relative to LNA 431 causes most of the detected signal at pen tip 206a to be transmitted to the LNA 431. The TSM 434 also may transmit an output to the WG 435 to disable the WG 435, which may be advantageously used to conserve power in the active stylus pen 206. In some configurations, the pen tip 206a when coupled to a host device 100 may detect a signal from the host device 100, by monitoring the signal received by the LNA 431 as PA 436 is operating in high impedance mode. After being amplified at LNA 431, the detected signal is provided to both the phase discriminator 432 and the peak detector 433. The respective outputs from the phase discriminator 432 and peak detector 433 are then transmitted to TSM 434, which uses the estimated phase and frequency to control the output of the WG 435.

Upon determining the estimated phase and frequency of the signal received from the host device 100, the TSM 434 may cause the active stylus control element 410 to operate in transmit mode by enabling the PA 436 and causing the WG 435 to begin generating an output signal according to the phase, amplitude and frequency information provided by the TSM 434. The output signal generated by the WG 435 may next be amplified by the PA 436. In one or more embodiments, LNA 431 may have a relatively large input impedance compared to the pen tip 206a, so that the amplified signal will be transmitted to the pen tip 206a, in order to affect the sensed capacitance due to the capacitive coupling of the pen tip 206a to the touch sensing components in the user interface 104.

Figure 5A:
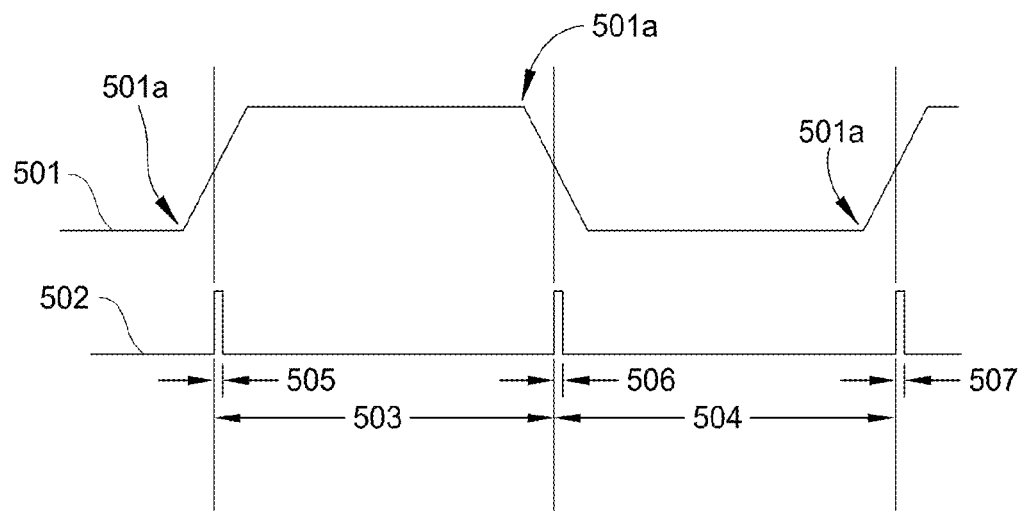
FIG. 5A is a schematic signal diagram illustrating aspects of the process of performing phase discrimination on a touch-sensing device output signal, according to an embodiment of the invention.

In one example, the operation and/or output of the phase discriminator 432 is illustrated by signal 502 in FIG. 5A. The output at a particular sense electrode 116 of touch screen 111, as detected by an active stylus pen 206, is depicted by signal 501. The phase discriminator 432 receives the detected signal 501 as an input as well as timing information from the clock source 437. Upon detecting a zero crossing of the signal 501 at the pen tip 206a, which begins at each point 501a, the phase discriminator 432 transmits a pulse of one clock cycle to the TSM 434, as depicted by the increase of signal 502 during time periods 505, 506, and 507.

The TSM 434 may also perform a calibration function using the output of the phase discriminator 432 to improve the accuracy of the timing of the output signal transmitted to the pen tip 206a. The TSM 434 may estimate the propagation delay occurring in each of the LNA 431 and phase discriminator 432 by comparing the timing of the pulses generated by the phase discriminator 432 to the zero crossings of the signal generated by WG 435. The propagation delay value may be saved in memory unit 206e and used in successive synchronization mode cycles by the active stylus pen 206 to improve the communication with the capacitive sensing components in the host device 100.

Figure 5B:
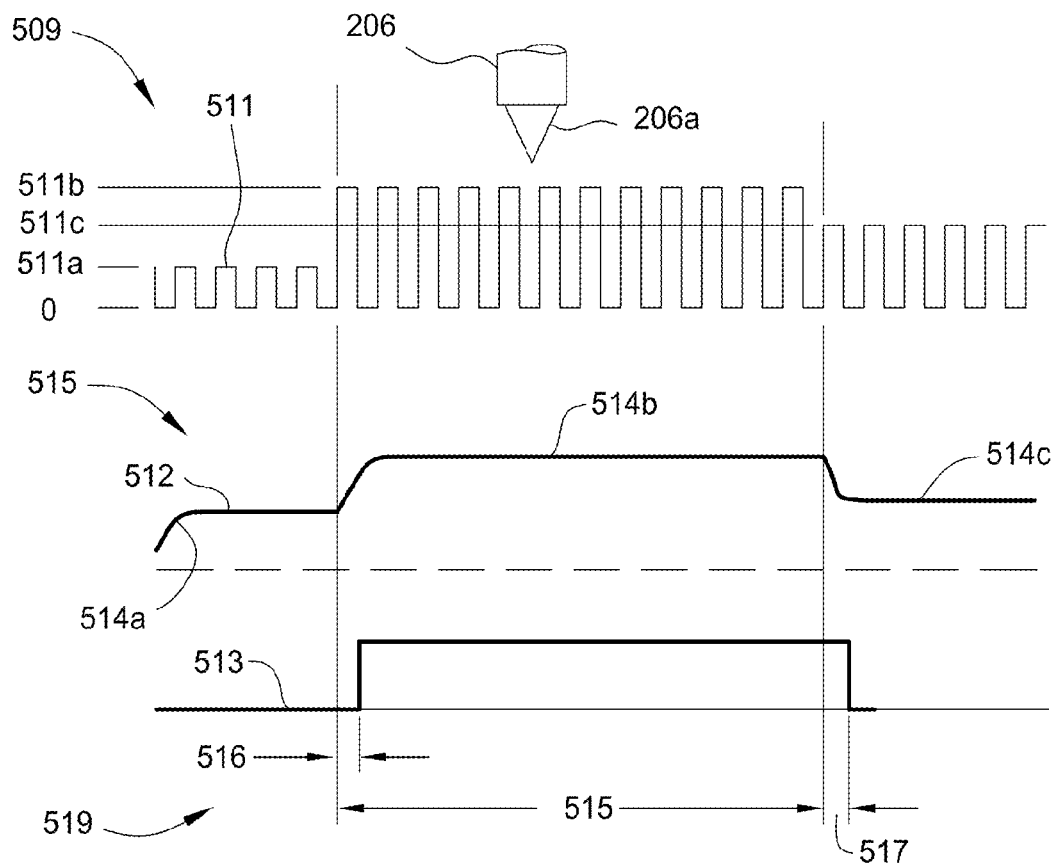
FIG. 5B is a schematic signal diagram illustrating aspects of the process of performing peak detection on a touch-sensing device output signal, according to an embodiment of the invention.

The operation of peak detector 433 is illustrated in FIG. 5B. The peak detector 433 is configured to determine a maximum amplitude of the signal detected at pen tip 206a. The maximum amplitude of the detected signal indicates that the column driver 113 signal is being applied to a column that is nearest to the pen tip 206a, which is further used to determine a timing window in which the active stylus control element 410 may transmit to the pen tip 206a during successive scan cycles.

Graph 509 of FIG. 5B depicts a signal 511, which has been detected at pen tip 206a and amplified by LNA 431. Peak detector 433 receives signal 511, performs a rectification function on signal 511, and integrates the rectified signal. The resulting integrated signal is depicted by signal 512 of FIG. 5B.

As shown, signal 511 has an initial amplitude 511a, which corresponds to the pen tip 206a at a particular distance from the column currently being driven by column driver 113. The corresponding portion 514a shows the rectified, integrated signal 512 increasing until the integrator component reaches a steady state level. The amplitude of signal 511 increases to 511b at time period 515; the stronger detected signal indicates that the distance has decreased between pen tip 206a and the currently driven column. Again the corresponding portion 514b shows the rectified, integrated signal 512 increasing until the integrator component reaches a new steady state level. After time period 515, the amplitude of signal 511 decreases to 511c, indicating that this distance has increased. When measuring the amplitude of signal 511 for a particular scan cycle, the first decrease in amplitude following one or more periods of increasing amplitude indicates that the signal has reached its maximum, based on the location of pen tip 206a for that particular scan cycle. This decrease in amplitude is detected by the peak detector 433 and is shown as the negative slope of signal portion 514c.

The amplitude decrease marks the end of the time window during which the column driver 113 is driving a column that is nearest to the pen tip 206a. The amplitude values that correspond to column driver 113 driving the nearest columns (i.e., amplitudes 511a-c) may thus be learned by the TSM 434 during one particular scan cycle. TSM 434 may then determine a threshold value based on the plurality of signal amplitude values (i.e., amplitudes 511a-c), so that comparing the signal amplitudes in subsequent scan cycles with the threshold value may result in more quickly determining when column driver 113 is driving the column(s) nearest to the pen tip 206a. In a subsequent scan cycle, TSM 434 may use the threshold value to define a time window during which any amplitudes that exceed the threshold value are detected at the peak detector. Defining this time window allows the active stylus control element 410 to transmit to the pen tip 206a during this time window on successive scan cycles. An example time window is depicted as signal 513 of graph 519 of FIG. 5B; for purposes of this example, assume TSM 434 determined the threshold value to equal amplitude 511c, so that signal 511 exceeds the threshold value only at amplitude 511b. Such a determined threshold value indicates here that active stylus control element 410 will transmit when detecting a single nearest column. The response of signal 513 may slightly lag the changes in frequency of signal 511 due to delays interposed by applying the rectification, integration, and filtering functions to signal 511. In other configurations, TSM 434 may determine a lesser threshold value that allows more than one amplitude of detected signal to pass; correspondingly, such a threshold value may allow active stylus control element 410 to transmit when detecting one or more nearest columns.

Figure 6:
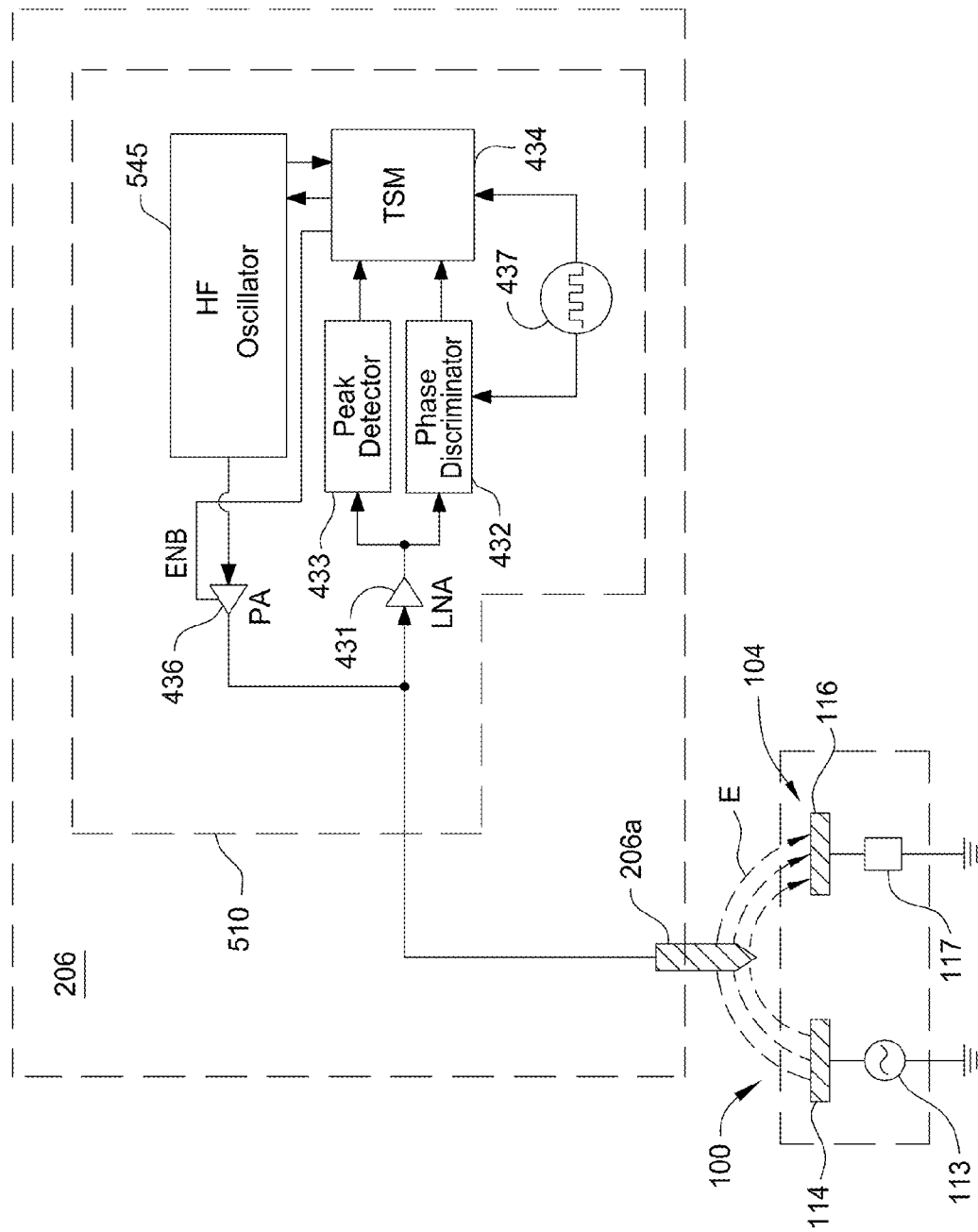
FIG. 6 is a schematic diagram of an active stylus pen interacting with a mutual capacitance sensing type host device, according to an embodiment of the invention.

FIG. 6 illustrates the components of an active stylus pen 206 capable of interacting with a host device 100 that is configured for mutual capacitance sensing, according to an embodiment of the invention. In this configuration, the active stylus pen 206 is further configured with an active stylus control element 510, which comprises a low-noise amplifier (LNA) 431, a phase discriminator 432, a peak detector 433, a timing state machine (TSM) 434, a high frequency (HF) oscillator 545, a power amplifier (PA) 436, and a clock source 437.

In one or more configurations, the LNA 431 may provide a passband of 50 kHz to 500 kHz frequencies prior to amplification and may further provide a stopband at approximately 2 MHz. The HF oscillator 545 generally includes a device that is able to deliver a high frequency signal burst to the PA 436 so that a HF signal at a desired amplitude and frequency can be delivered to the pen tip 206a. The HF oscillator 545 may generate signals at harmonics of the fundamental frequency; that is, the HF oscillator 545 may generate at frequencies that are integer multiples of the signal detected at pen tip 206a. For example, if the detected signal has a 300 kHz frequency (i.e., the fundamental frequency), the HF oscillator 545 could generate a 3 MHz signal (which is ten times the fundamental frequency). Advantageously, transmitting at harmonic frequencies ensures that any phase shift in the detected signal is preserved in the generated signal, and also improves the sensitivity of LNA 431 to detected signals by generating a HF signal far outside of the passband frequencies of LNA 431.

According to the configuration illustrated in FIG. 6, the active stylus control element 510 may generally operate in the same manner as active stylus control element 410, described above. However, active stylus control element 510 differs primarily by its use of the HF oscillator 545 to generate output signals to transmit to pen tip 206a, instead of using a waveform generator 435 as in active stylus control element 410. A feature of this configuration is the ability of the active stylus control element 510 to detect a signal from the user interface 104 at the pen tip 206a while simultaneously transmitting to the pen tip 206a using a different frequency. Certain other embodiments, such as the embodiment depicted in FIG. 4, may operate using coherent signals, such as when both the detected and transmitted signals share the same frequency and phase. Because coherent signals generally sum together, the information contained in each distinct signal may be lost at the pen tip 206a, and thus these other embodiments may be unable to perform simultaneous detecting and transmitting. However, signals that vary in frequency do not sum in the same manner as coherent signals, and so the information in each signal may be better preserved. HF oscillator 545 may generate an output signal having frequencies at one or more harmonics of the detected signal, and thus the output signal when transmitted to the pen tip 206a may not be summed with the detected signal. In one example, the frequency of the touch sensing signal received by the active stylus pen 206 from the host device 100 is between about 75 kHz and about 450 kHz, and the signal provided by the active stylus pen 206, which is used to affect the sensed capacitance $C_s$ in the host device 100, is between about 2 MHz and about 433 MHz. In one example, the active stylus pen 206 delivers a signal at a frequency less than about 433 MHz. In another example, the active stylus pen 206 delivers a signal at a frequency between about 2 MHz and about 40 MHz. In one example, the active stylus pen 206 delivers a signal at a harmonic of the received signal and within ISM frequency bands between about 2 MHz and 433 MHz (i.e., about 6.78 MHz, about 13.56 MHz, about 27.12 MHz, about 40.68 MHz, and about 433.92 MHz). In another example, the active stylus pen 206 delivers a signal at a harmonic frequency of (and in phase with) the received signal at a frequency about 433 MHz.

Figure 7:
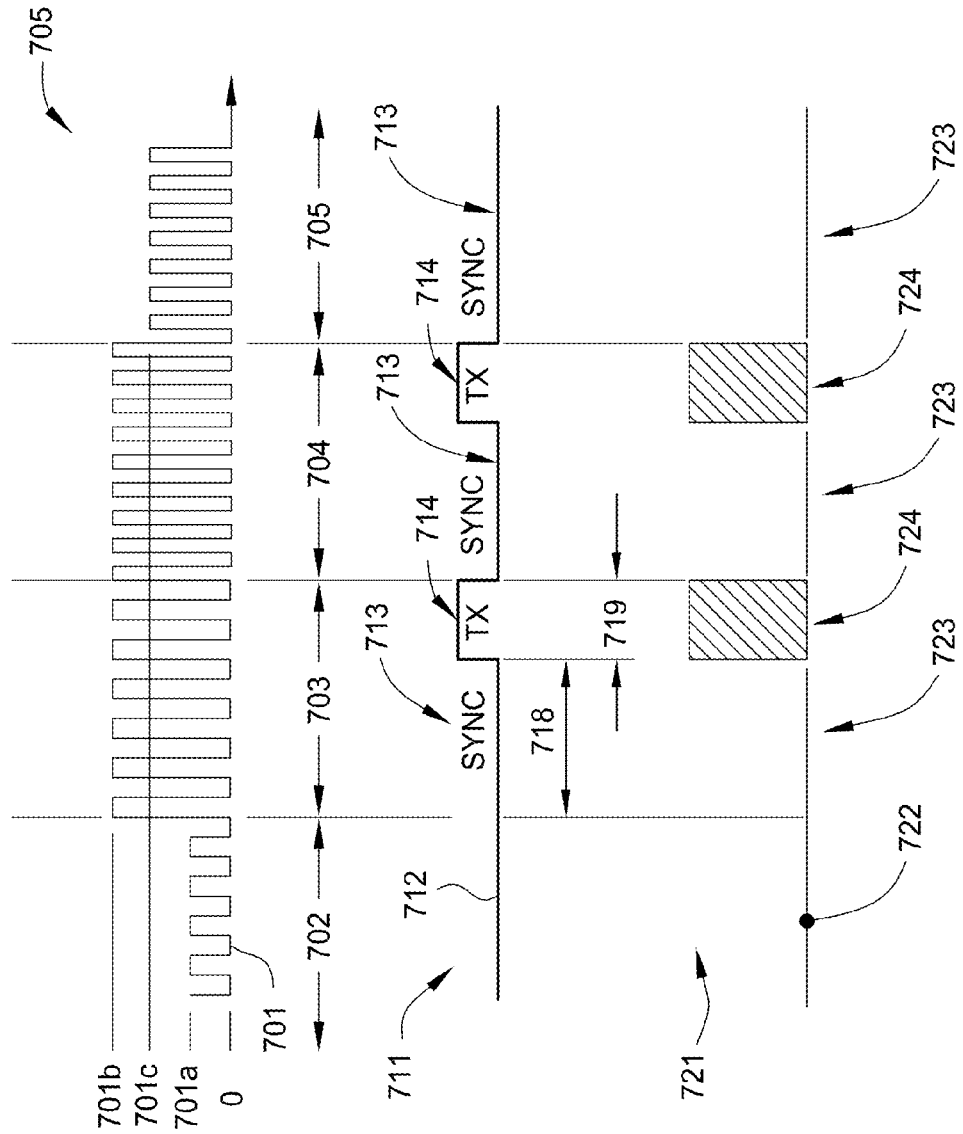
FIG. 7 is a schematic signal diagram illustrating aspects of the process of detecting a touch-sensing device output signal and synchronizing an active stylus pen thereto, according to an embodiment of the invention.

The operation of active stylus control element 510 containing a HF oscillator 545 is illustrated in FIG. 7. FIG. 7 generally illustrates a driven touch-sensing detected signal 701 and a type of controlling signal 721 that is generated and provided to the pen tip 206a by the active stylus control element 510, according to an embodiment described herein. To provide desirable user input the active stylus control element 510 may generally operate in a synchronization mode 713 and/or in a transmit mode 714. Graphs 705 and 711 of FIG. 7 illustrate principles that are substantially similar to those principles illustrated in graphs 300 and 315 of FIG. 3B, respectively, and described above. As shown, the controlling signal 721 is not transmitted to the pen tip 206a while active stylus control element 510 is in synchronization mode 713. During time periods while active stylus control element 510 is in transmit mode 714 (such as time period 719), the controlling signal 721 is transmitted to the pen tip 206a, and contains a HF signal 724 generated by the HF oscillator 545 at a harmonic frequency of (and in phase with) the detected signal 701. After successful synchronization to the detected signal 701 after one or more scan cycles, active stylus control element 510 may continue to sense the detected signal 701 at pen tip 206a while concurrently transmitting the controlling signal 721 to pen tip 206a.

Figure 8:
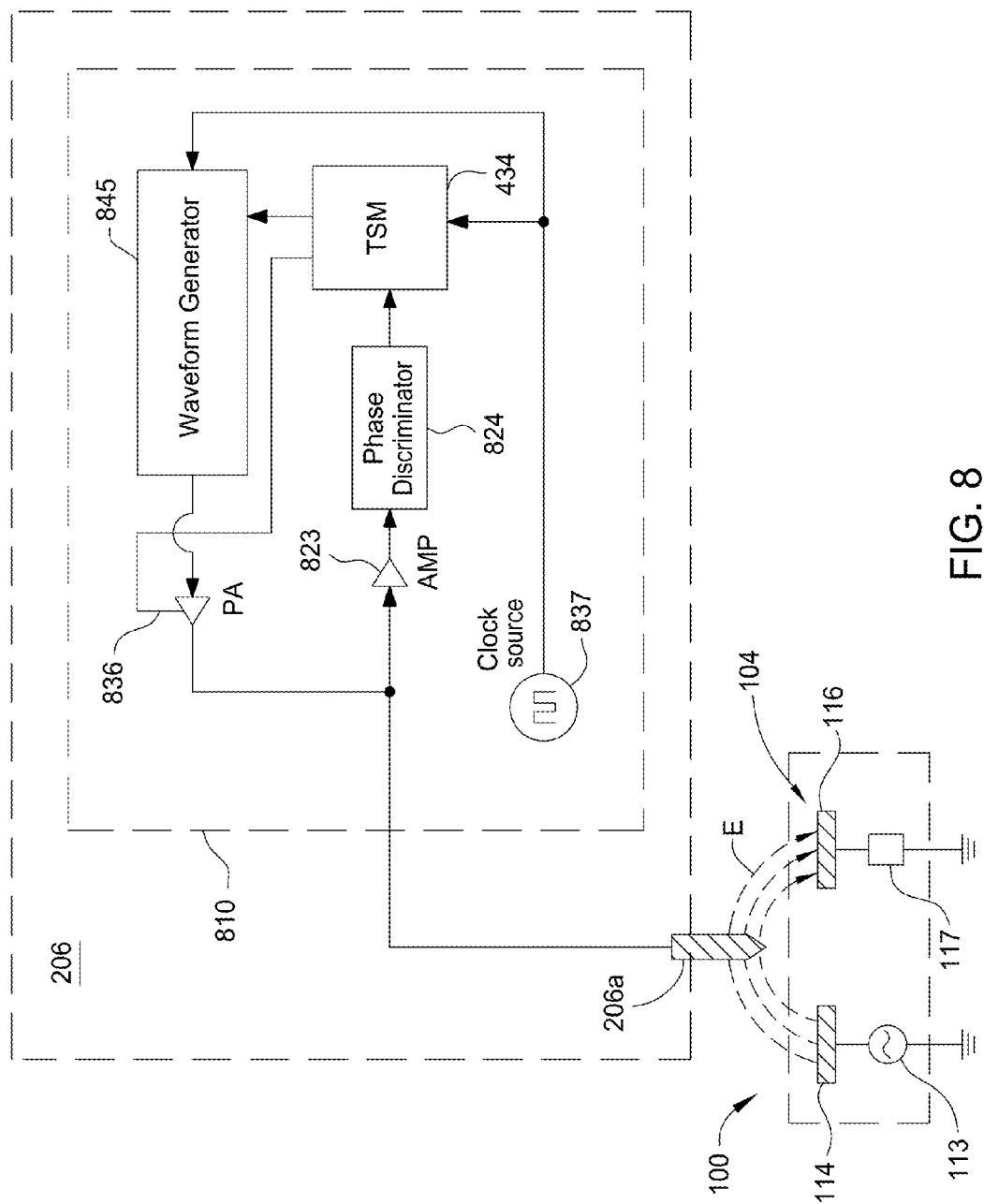
FIG. 8 is a schematic diagram of an active stylus pen interacting with a mutual capacitance sensing type host device, according to an embodiment of the invention.

FIG. 8 provides a schematic diagram of an active stylus pen interacting with a host device 100 that is configured for mutual capacitance sensing, according to an embodiment of the invention. The active stylus pen 206 may couple to the host device 100 through pen tip 206a. The active stylus pen 206 is further configured with an active stylus control element 810, which comprises an amplifier (AMP) 823, a phase discriminator 824, a timing state machine (TSM) 434, a waveform generator (WG) 845, a power amplifier (PA) 836, and a clock source 837. According to the configuration illustrated in FIG. 8, the active stylus control element 810 may generally operate in the same manner as active stylus control element 410, described above. However, active stylus control element 810 differs primarily by not using a peak detector 433 to process detected signals from pen tip 206a, as well as having differences in several components.

In one configuration, the phase discriminator 824 may comprise a single comparator. As such, the phase discriminator 824 may detect zero crossings but may not fully preserve the amplitude information of the input signal, providing only frequency and phase information to TSM 434. Besides providing other control signals, TSM 434 may provide the frequency, amplitude, and phase information to WG 845. Because TSM 434 may not receive correct input signal amplitude information from the output of phase discriminator 824, the TSM 434 may instead estimate the appropriate amplitude of the WG 845 generated output signal by use of statistical modeling and/or analysis.

When active stylus control element 810 is operating in transmit mode, WG 845 generates an output signal using the frequency, phase, and estimated amplitude information provided by the TSM 434. As previously stated, TSM 434 may estimate the output signal amplitude using a statistical model corresponding to a particular host device 100. Because the strength of signals received from the host device 100 (and consequently, their respective S/N ratios) are initially unknown, the TSM 434 may not be able to immediately detect when the nearest column is being driven. Therefore, the TSM 434 may initially cause WG 845 to transmit this output signal at every zero crossing detected at the phase discriminator 824. After the TSM 434 has determined signal strengths and S/N ratios in subsequent scan cycles, WG 845 may transmit during time windows determined by TSM 434 to correspond with the times when column driver 113 drives at one or more columns located closest to the location of pen tip 206a. The output signal from the WG 845 may next be amplified by the PA 836. In one or more embodiments, AMP 823 may have a relatively large input impedance compared to the pen tip 206a; thus, most of the amplified signal will be transmitted to the pen tip 206a and in turn will affect the sensed capacitance at the coupling of the pen tip 206a and the user interface 104.

The TSM 434 may develop a statistical model corresponding to a particular host device 100 by observing the detected signal over a period of time typically comprising multiple scan cycles; the observation may include storing signal data or information in memory unit 206e, processing signal data using processor 206c, or using the storage or processing resources of the coupled host device 100 by communication through communications link 205. After a period of time sufficient to develop a statistical model, the TSM 434 may select whether to enter transmit mode and begin transmitting to pen tip 206a (i.e., by enabling PA 836 and by starting or continuing the generating function of WG 845) based on a comparison of the received signal from phase discriminator 824 and the statistically modeled signal. If the calculated error between the two compared signals is relatively lower (meaning that the related signal-to-noise ratio (S/N) is relatively higher), this tends to indicate that column driver 113 is currently driving a column near to the location of pen tip 206a. Similarly, if the error between the two compared signals is relatively higher (and thus the signal to noise ratio is relatively lower), this indicates that column driver 113 is driving a column further away from the pen tip 206a. After observing the range of error values over a period (for example, over one or more full scan cycles of host device 100), the TSM 434 may determine a time window when the column driver is driving one or more column(s) closest to the location of pen tip 206a based on the relative lowest error values. Having determined a suitable time window, TSM 434 may choose to enter transmit mode and cause WG 845 to transmit an output signal during that time window in successive scan cycles.

Alternately, in some embodiments, the TSM 434 may compare signals received from the host device 100 at different times to determine whether the column driver 113 is driving a column that is near or further away from the pen tip 206a. In this configuration, the TSM 434 compares the signal-to-noise ratio values (e.g., noise in the received signal) of the detected signals to determine which signal has the lowest signal-to-noise ratio value (e.g., greater amount of noise contained within it). Since signals delivered over larger distances will be affected more by external noise sources than signals delivered over shorter distances, the signal that is received from a column that has the lower signal-to-noise ratio value is likely farther away from the pen tip 206a than a column that has the higher signal-to-noise ratio value. Therefore, the TSM 434 can determine when one or more nearest columns are being driven by comparing the signal-to-noise ratio of the signals received at different times to determine when the nearest column(s) are delivering a signal to the pen tip 206a. Having determined a suitable time window, TSM 434 may choose to enter transmit mode and cause WG 845 to transmit an output signal during that time window in the current and/or in a successive scan cycle.

In another embodiment, the TSM 434 may be provided statistical models that represent the output of one or more host devices 100. Based on a statistical model corresponding to a currently selected host device 100, the TSM 434 may estimate the amplitude of the output signal, and may generate the signal that is delivered to the WG 845 accordingly. The statistical models relating to host devices 100 that are provided to the TSM 434 may be updated from time to time and may be based on centralized updates (e.g., models include new host devices 100) or on historical usage data from the particular TSM 434 (e.g., adjusting the model to reflect an environment in which the host device 100 is used and in which the measured signal consistently differs from the statistical model).

Figure 9:
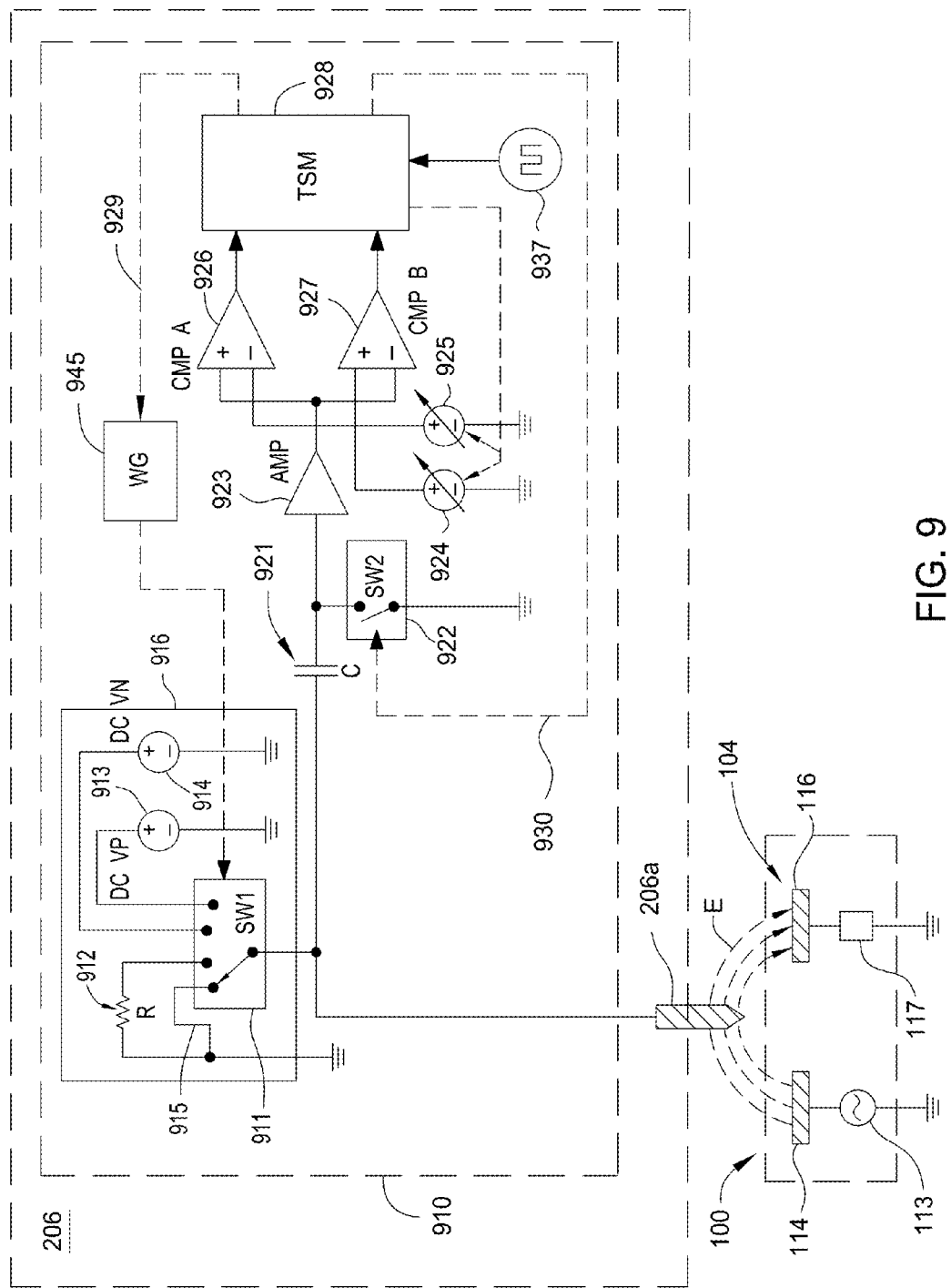
FIG. 9 is a schematic diagram of an active stylus pen interacting with a mutual capacitance sensing type host device, according to an embodiment of the invention.

FIG. 9 provides a schematic diagram of an active stylus pen interacting with a host device 100 that is configured for mutual capacitance sensing, according to an embodiment of the invention. The active stylus pen 206 may couple to the host device 100 through pen tip 206a. The active stylus pen 206 is further configured with an active stylus control element 910, which for ease of discussion may have its components grouped into detection components and driving components. The detection components of the active stylus control element 910 comprise a capacitor 921, clamping amplifier switch (SW2) 922, amplifier (AMP) 923, a window comparator comprised of comparator ($CMP_A$) 926 and comparator (CMP$_B$) 927, variable threshold voltage sources 924 and 925, TSM 928, and clock source 937. The driving components of the active stylus control element 910 comprise the TSM 928, a waveform generator (WG) 945, switch (SW1) 911, pen drive voltages DC VP 913 and DC VN 914, a resistor (R) 912, and a ground position 915. TSM 928 may steer the amplitude of the voltages generated by variable threshold voltage sources 924 and 925, and pen drive voltages DC VP 913 and DC VN 914. TSM 928 may perform the voltage steering based on a table look-up for a detected signal that corresponds to a particular host device 100, based on the magnitude of the signal detected at pen tip 206a, based on an algorithm implemented in the TSM 928 that may evaluate the signal, based on information communicated by the active stylus pen 206 through communication link 205 to the host device 100, or based on some combination of these.

When a signal is transmitted by the user interface 104 and detected at pen tip 206a, the detected signal is amplified by AMP 923, and then provided as one input to both CMP$_A$ 926 and CMP$_B$ 927. Alternately, an analog-to-digital converter (ADC) could replace the window comparator of CMP$_A$ 926 and CMP$_B$ 927 located between AMP 923 and TSM 928. While an ADC may provide comparable performance to the window comparator configuration described herein, the window comparator can provide some additional benefits over an ADC configuration, such as it will generally produces less noise, it can typically be implemented at a lower cost and it requires less power, which can be important for battery powered products.

As a default, SW1 911 may be set by TSM 928 to R 912, and SW2 922 to open, and thus the high impedance at each switch will cause most of the detected signal to be sent through C 921 to AMP 923. CMP$_A$ 926 and CMP$_B$ 927 each have a variable threshold voltage source (925 and 924, respectively) providing a second input to each comparator. The variable threshold voltage sources 924 and 925 may provide voltages of identical magnitudes (e.g., +5 V and −5 V) or may provide voltages of differing magnitudes (e.g., +5 V and −3 V). Variable threshold voltage source 924 connects to the positive input of CMP$_B$ 927, and variable threshold voltage source 925 connects to the negative input of CMP$_A$ 926. In either comparator 926 or 927, if the signal on the positive input is greater than the signal on the negative input, the voltage output is driven to the positive supply voltage (which corresponds to, and will be referred to as, a logic "one"). If the signal on the negative input is greater than the signal on the positive input, the voltage output is driven to the negative supply voltage (which corresponds to, and will be referred to as, a logic "zero"). Together the comparators 926 and 927 and variable threshold voltage sources 924 and 925 provide adjustable threshold values that allow TSM 928 to selectively transmit if the detected signal falls outside those values (i.e., if the detected signal is too weak). Advantageously, using the window comparator configuration to provide peak detection provides a nearly instantaneous response, which may provide a better response to fast movements of active stylus pen 206; peak detection techniques that use an integration function are subject to some delay and thus are not as responsive. Further, the TSM 928 may be able to increase sensitivity to the detected signal by making appropriate selections of threshold values.

The TSM 928 may change the magnitude of the variable threshold voltage sources 924 and 925 in order to set an appropriate threshold value that can distinguish one or more largest magnitudes of the detected signal. As discussed above, the largest magnitudes of the detected signal indicate that the column driver 113 is driving one or more columns that are nearest to the pen tip 206a. To determine the appropriate threshold value, the TSM 928 may initially set the threshold value to zero. While the detected signal is present at TSM 928, TSM 928 may increase the threshold value until the signal can no longer be detected, then decrease the threshold value an amount so that the largest magnitudes of the detected signal will exceed the threshold value. The window comparator configuration may function similar to an ADC; to adjust the threshold values, TSM 928 may use standard analog-to-digital conversion techniques such as successive approximation, ramp-compare, or any other suitable technique that can determine one or more largest magnitudes of the detected signal. The TSM 928 may further adjust the threshold values to compensate for drift of AMP 923. To determine the required adjustment of the threshold values, TSM 928 may compare the smallest value of the determined largest magnitudes of the detected signal to the current voltage values of variable threshold voltage sources 924 and 925. To make the adjustment to the threshold values, TSM 928 transmits appropriate signals to modify variable threshold voltage sources 924 and/or 925; this may include transmitting to a digital-to-analog converter, transmitting control signals to a programmable resistor, or transmitting to a pulse width modulator (PWM), which may cause the desired charges to variable threshold voltage sources 924 and/or 925. During subsequent scan cycles, the window comparator having the appropriate threshold value will filter the detected signal similar to the operation of the peak detector of alternate embodiments. The window comparator may thus provide indication to the TSM 928 when the columns nearest to the pen tip 206a are being driven, and TSM 928 may send appropriate control signals to the WG 945 and the SW1 911 in order to transmit a signal to pen tip 206a during these windows of the scan cycle.

The window comparator may also provide a phase detection functionality to the active stylus control element 910. When the amplified detected signal (i.e., the output of AMP 923) is received at CMP$_A$ 926 and CMP$_B$ 927, the signal is compared against the threshold values provided by variable threshold voltage sources 925 and 924, respectively. If the signal amplitude falls between the two threshold values, both CMP$_A$ 926 and CMP$_B$ 927 will output a logic "zero" to the TSM 928; however, if the signal exceeds one of the threshold values, the corresponding comparator will output a logic "one" to TSM 928. For example, say the threshold voltage provided by variable threshold voltage source 925 is 5 V, and the signal amplitude is 6 V, CMP$_A$ 926 will output a logic "one" to TSM 928.

Upon receiving a logic "one" from either CMP$_A$ 926 or CMP$_B$ 927, TSM 928 may transmit a control signal 929 to WG 945 depending on the phase requirements of the host device 100. If the host device 100 requires the generated signal and detected signal to be in phase, TSM 928 will transmit a control signal 929 to WG 945 selecting the appropriate pen drive voltage (DC VP 913 or DC VN 914) at SW1 911 corresponding to which threshold the value was exceeded. In other words, if the output of AMP 923 exceeds the positive threshold, TSM 928 will select DC VP 913. Alternately, if the output of AMP 923 exceeds the negative threshold, TSM 928 will select DC VN 914. If host device 100 requires the signals to be 180° out of phase, TSM 928 will select the pen drive voltage opposite to which threshold the value was exceeded.

Upon detecting that one of the threshold values was exceeded, but prior to selecting a pen drive voltage at SW1 911, the TSM 928 closes SW2 922 such that the input of AMP 923 is grounded, which allows C 921 to charge and protects AMP 923 from receiving a voltage transient at its input that may saturate the AMP 923. TSM 928 then transmits control signals to WG 945 to select the appropriate pen drive voltage at SW1 911. After SW1 911 is switched to the appropriate pen drive voltage, pen tip 206a and C 921 are charged to the voltage provided by the selected pen drive voltage, and TSM 928 returns both switches to high impedance states (i.e., SW1 911 selects R 912, and SW2 922 is opened) to preserve the voltage at the pen tip 206a to be able to change the sensed capacitance of the host device 100 to a desired level at a desired time.

To continue the previous example, if the detected signal at pen tip 206a decreases, the changing component of the signal will be transferred across C 921 to AMP 923. Assume that the amplified signal amplitude next decreases to −6 V, exceeding a threshold voltage of −5 V at variable threshold voltage source 924. $CMP_B$ 927 may then transmit a logic "one" to TSM 928. Assuming that the signals must be coherent (same frequency and phase), TSM 928 sends control signals 929 to cause WG 945 to close SW2 922 and connect DC VN 914 to pen tip 206a. Pen tip 206a and C 921 charges to the voltage at DC VN 914, and TSM 928 returns both switches to high impedance states as before.

A ground position 915 is provided in SW1 911 to connect to pen tip 206a and C 921. The ground position 915 may be desirable to provide calibration data by estimating charge leakage in the various components of active stylus control element 910, or may provide a path to remove residual charge from pen tip 206a and C 921. Additionally, ground position 915 may be used to provide a zero signal to the pen tip 206a; for example, a particular host device 100 may require sensing a zero for a determined amount of time when transitioning between the sensed level corresponding to the DC VP 913 voltage state and the sensed level corresponding to the DC VN 914 voltage state.

Advantageously, the TSM 928 may be able to more accurately measure detected signals by calibrating the detection components to negate the effects of offset and leakage caused by process, voltage, and temperature variations. The TSM 928 may close SW2 922 such that the input to AMP 923 is grounded; the output of AMP 923 should similarly equal zero volts. This zero output, in turn, may be compared against the outputs of variable threshold voltage sources 924 and 925 to allow TSM 434 to determine the current range of comparators $CMP_A$ 926 and $CMP_B$ 927; TSM 434 may adjust the values of variable threshold voltage sources 924 and 925 to operate in the desired range.

Advantageously, the voltage clamped amplifier configuration permits the active stylus control element 910 to transmit to pen tip 206a and detect signals at pen tip 206a simultaneously though transmitting and receiving signals whose strengths differ by several orders of magnitude. The clamping amplifier configuration also consumes less power than alternative configurations having a comparable input range, gain, and bandwidth.

The present invention can be implemented in the form of control logic in software or hardware, or in a combination of both. The control logic may be stored in an information storage medium as a plurality of instructions adapted to direct an information-processing device to perform a set of steps disclosed in embodiments of the present invention. Based on the disclosure and teaching provided herein, a person of ordinary skill in the art will appreciate other ways and/or methods to implement the present invention.

Additional Configurations/Designs

Pen & Digitizer Interaction

Figure 10:
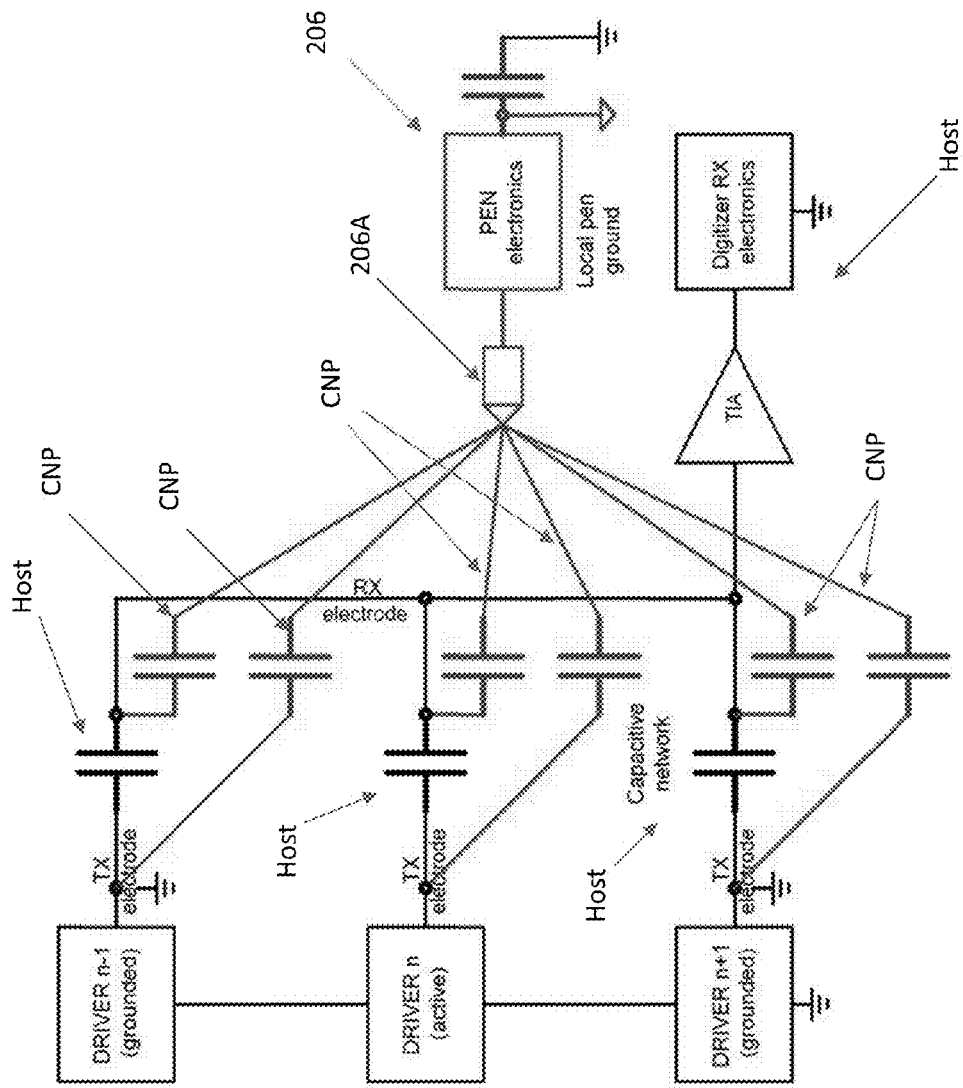
FIG. 10 is a schematic diagram of an active stylus pen interacting with a mutual capacitance sensing type host device, according to an embodiment of the invention.

Tablet digitizer projected capacitive sensor, or host device 100 (e.g., touch-screen containing device), typically includes an array of drivers connected to the driving electrodes crossing orthogonally the array of sensing electrodes connected to the amplifiers. FIG. 10 schematically illustrates a portion of a host device 100 and an active stylus pen 206 that is interacting with the host device 100. The presence of the surface object (e.g., an active stylus pen 206) upsets the equivalent capacitance measured between the driving and the sensing electrodes in the host device 100. By calculating the difference between initial and resulting capacitance (charge) the host device 100 deduces the object interaction and therefore its position on the sensor surface.

The drivers are activated on one by one basis. All inactive drivers are driving a reference level (ground) to the corresponding driving electrodes.

The pen/digitizer interaction is depicted on the following scheme is illustrated in FIG. 10. In some embodiments, any of the entities described herein may be embodied by a computer that performs any or all of the functions and steps disclosed.

The portion of the capacitive network in labeled "Host" corresponds to the un-upset capacitance. The "CNP" portion of the capacitive network shows the coupling to the object (i.e., active stylus pen 206).

The active stylus pen 206 closes the current loop by the capacitor between its local ground and the global ground (e.g., body of the host device 100 (e.g., tablet computer)).

The common technique to sense the capacitance is throughout the measurement of the charge transfer via the capacitive network.

Since the dQ=idt, where "i" is the immediate current flowing from the driver via the capacitive network to the input of the sensing electronics, by integrating from zero time mark to the time "T", the total charge is obtained.

The trans-impedance amplifier (TIA) sensing architecture is employed in order to measure the immediate value of "i" and convert it into the voltage for the further processing.

Below there are several different pen architectures presented, which generally relate to some of the designs discussed above, such as the configurations discussed above in conjunction with FIG. 4. The discussion below highlights the major elements of these designs, and thus is only a partial representation of the complete pen architecture configuration. The depicted designs and discussion primarily focus only the magnitude relation of the input/output signal. It is assumed that the time bases of the digitizer sensor and the active pen are perfectly synchronized.

Voltage Sensing Architecture

Figure 11:
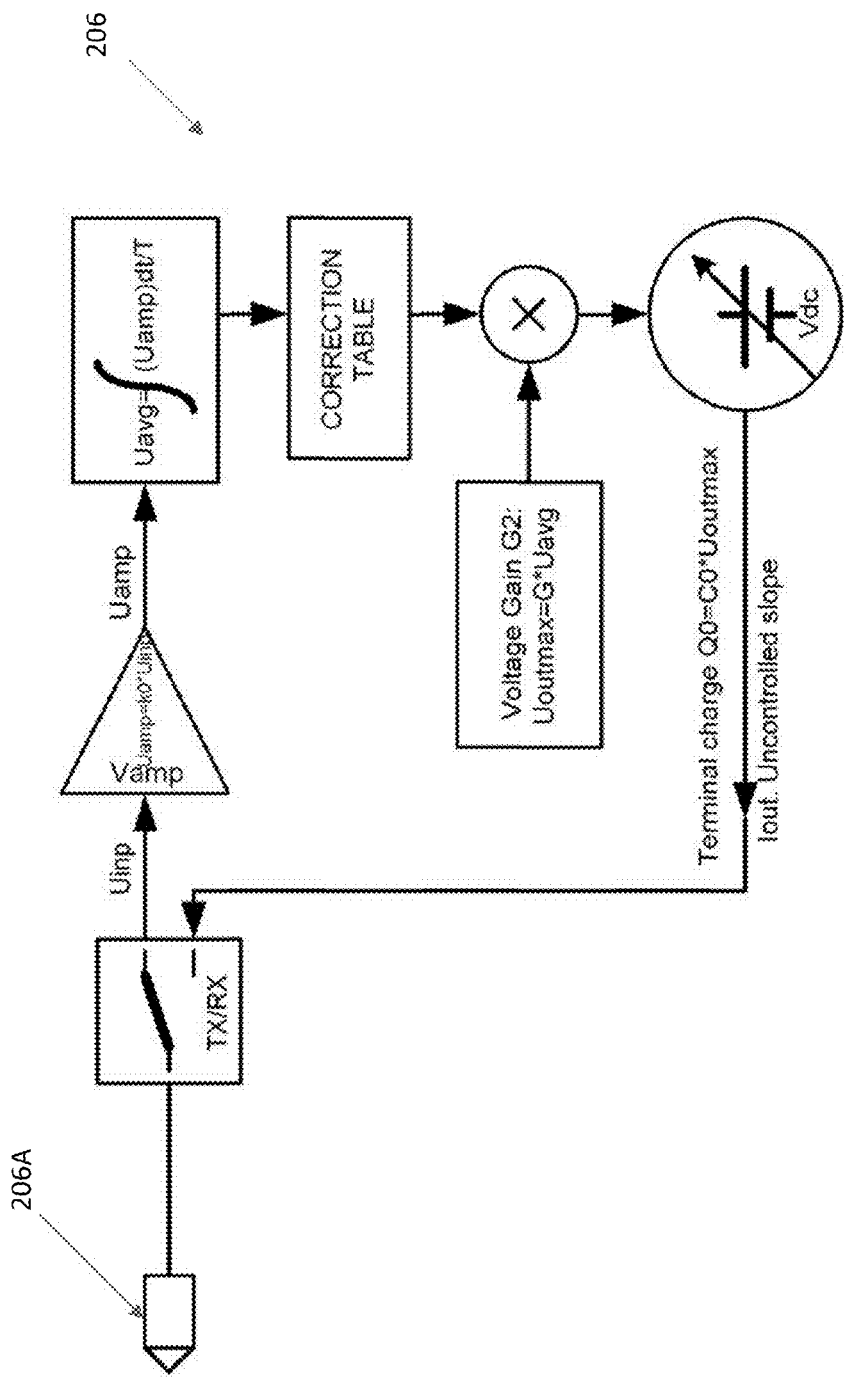
FIG. 11 is a schematic diagram of an active stylus pen for use with a mutual capacitance sensing type host device, according to an embodiment of the invention.

Voltage sensing architecture with the terminal output voltage driver reciprocates the amplified sensed voltage by the input amplifier in the receive mode back to the tip 206A in the transmit mode. FIG. 11 is a schematic diagram of the voltage sensing architecture found in an active stylus pen, according to an embodiment of the invention. It is assumed, that the capacitive network configuration remains unchanged in the transmit mode and receive mode. Also it is assumed that the capacitive network has no non-linear features and the current and voltage relations can be represented by the system of linear equations (Kirchoff).

The capacitor between the pen's tip 206A and the capacitive network organized by the driving electrodes and the sensing electrode holds its charge $Q_0$ at the end of the integration period (drive transient), which can be expressed as $$Q_0 = U_{in} \times C_t$$

where $U_{in}$ is the instant voltage observed at the input of the voltage amplifier.

The voltage amplifier provides a constant gain across it's dynamic range. The averaging module, follows the amplifier, which is typically required to correct the capacitive charge transient (overshoot).

To reciprocate the proportional amount of charge via the same capacitive network, the gain factor is introduced.

The resulting value is sent to the programmable voltage source, which charges the capacitive network in the transmit phase to the value $$Q_{out} = \text{avg}(U_{in}) \times k \times \text{gain}.$$

The following design challenges and configurational solutions for these listed challenges are provided in the following table.

| Design Challenges | Configuration Details |
| --- | --- |
| Initial charge of the capacitive network is unknown | Special "staircase" TX signal is used instead of a simple rectangular signal. Before transmitting or just after transmitting (e.g., on each RX→TX or TX→RX transition), the input of the active stylus is clamped to its local ground. This way the new initial condition is created and the total charge applied is correctly metered therefore. |
| Charge rate of the active stylus in the TX mode is not controlled | In some embodiments, a controlled charge rate regulator can be added to the design. |
| TX mode adaptability to the total system charge | In some embodiments, during TX mode the active pen may runs in an open loop mode. |

Simple Current Sensing Architecture (CSA)

Figure 12:
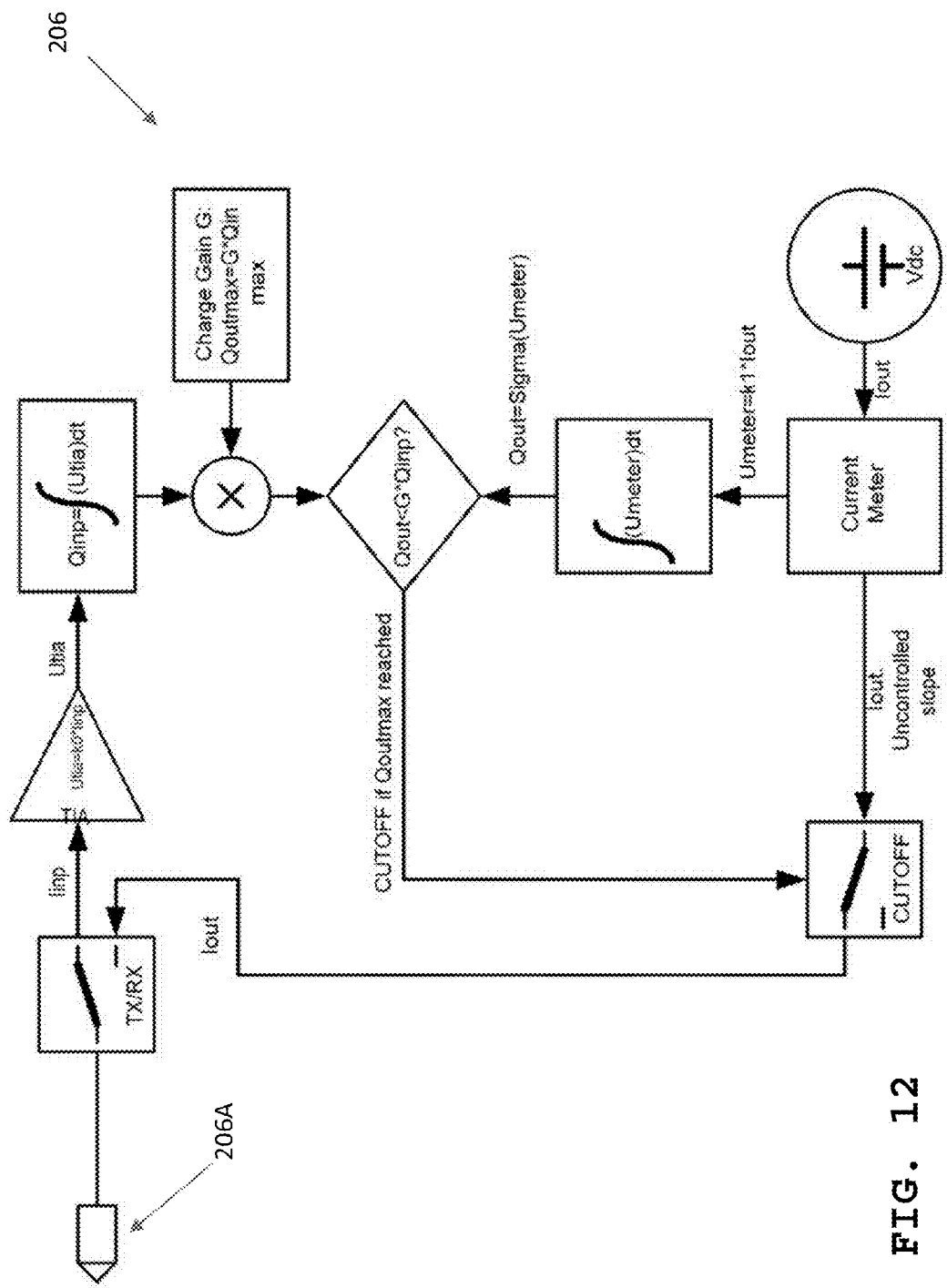
FIG. 12 is a schematic diagram of an active stylus pen for use with a mutual capacitance sensing type host device, according to an embodiment of the invention.

To overcome the deficiencies discussed above, especially unknown initial system charge and therefore, the voltage reference, a second alternate architecture is provided, or also defined herein as the current sensing architecture (CSA) is presented. The operating principle is based on reciprocating the measured charge back with the constant gain into the capacitive network. FIG. 12 is a schematic diagram of the CSA found in an active stylus pen, according to an embodiment of the invention.

In the $R_X$ mode, a part of the external capacitive network excitation immediate current flows from the sensor driver to the input of the trans-impedance amplifier (TIA). For the further processing this immediate current is converted into the voltage:

$$U_{tia} = i \times K_0$$

To realize the total amount ($Q_{in}$) of charge in the system flowing within one half-period, the integrator is employed, where $Q_{in}$ is:

$$Q_{in} = K_0 \times \int_{\varphi 0}^{\varphi 0 + \pi} i \, dt$$

The obtained total amount of charge per the first and the second half-period of the $R_X$ mode is later summed up (with different signs) and create the charge limit condition in the following $T_X$ mode.

In the simple CSA architecture, the charge rate (immediate $T_X$ current $i_{out}$) is not controlled. However, the total amount of charge is limited by the $Q_{in}$ value. This is achieved by adding the fast current meter into the transmit path, integrating it's immediate output current and cutting off the charge injection on the following condition $Q_{in} \leq K_1 \times \int I_{out} \, dt$.

Implementation of this architecture is not more complex, than VSA outlined before. The TIA/ADC part can be re-used in the $T_X$-mode too, for example, to provide the charge cut-off condition.

Current Sensing Architecture with Controlled Charge Rate (CSAC)

Figure 13:
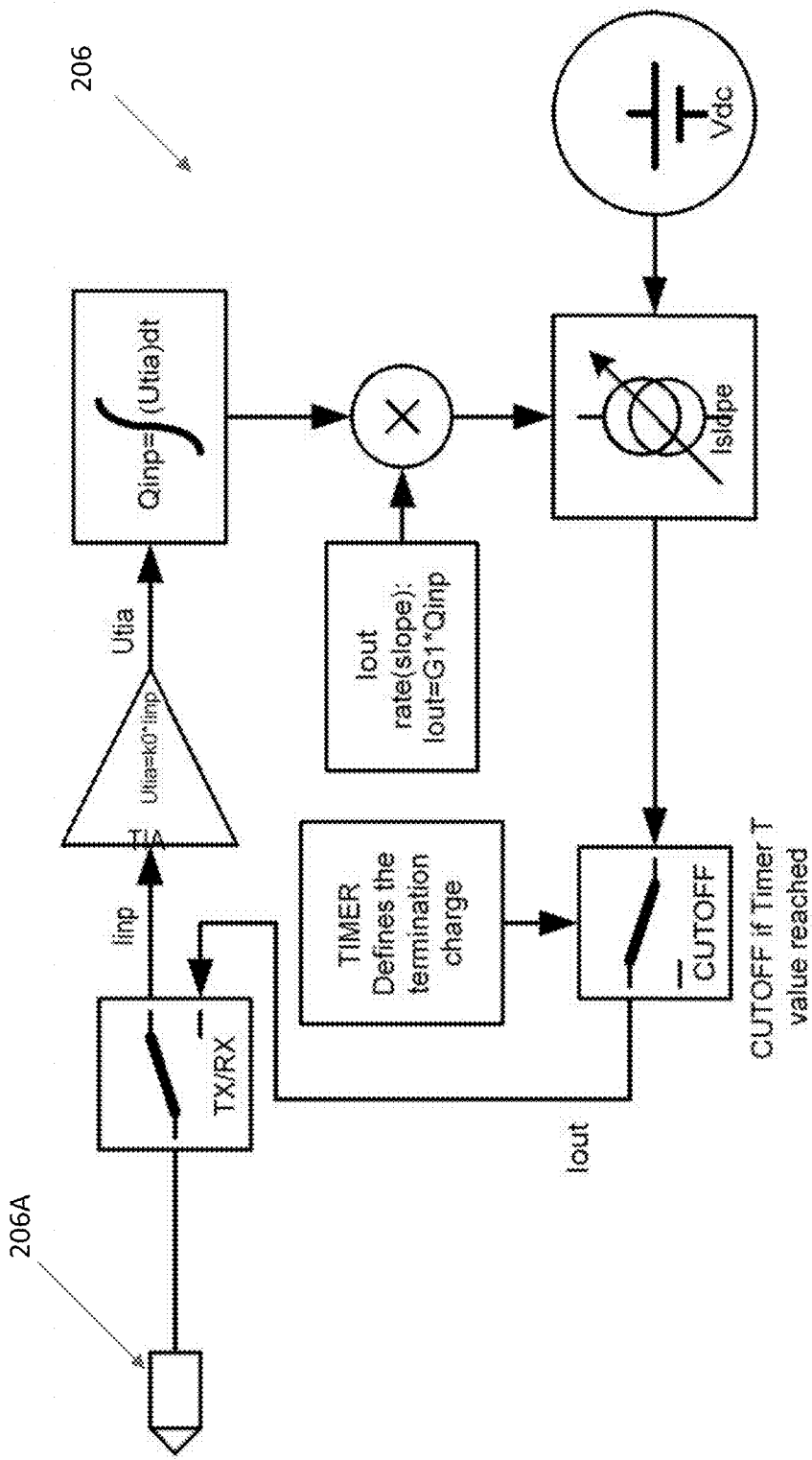
FIG. 13 is a schematic diagram of an active stylus pen for use with a mutual capacitance sensing type host device, according to an embodiment of the invention.

An alternate version of the CSA architecture, or Current Sensing Architecture with Controlled Charge Rate (CSAC), is outlined here, which can improve aspects of the active stylus pen's interaction with the host device 100. In general the alternate version includes an additional charge rate controller that is added into the transmit path. FIG. 13 is a schematic diagram of a second version of the CSA found in an active stylus pen, according to an embodiment of the invention.

The $R_X$ mode operation is identical to the simple CSA architecture (see CSA paragraph).

In the $T_X$-mode, the obtained $Q_{in}$ value is multiplied by the static gain factor. The resulting value will define the current rate, since now it is regulated in real-time by the programmable constant current source. In one example, the equation may include: $I_{out} = G_1 \times Q_{inp}$ Moreover, the current meter, integrator and comparator logic is not required. The timer will provide the timemark "T" when the charge will be switched off. This is because the $I_{out}$ value is constant throughout the charge transfer process. In other words, $Q_{out} = I_{out} \times T = G_1 \times Q_{inp} \times T$, where $G_1$ and T are the runtime constants.

There are several benefits in adding the programmable current source into the $T_X$-path, since this way the slew rate is 100% controlled, system runs in a close loop and the timing and the rate can be adapted to the large variety of the digitizer products.

VSA and CSA uncontrolled slew rate could create the over current conditions and overload the TIA sensing amplifier resulting in the active stylus pen trajectory distortion and active stylus pen tracking loss.

Also CSAC architecture doesn't require the complex analog circuitry for the fast precise current measurement.

However, the most important advantage of CSAC is in the constant charge transfer timing interval T. Typically, the sampling points of the digitizer remain largely unknown to manufacturers of the active stylus pen's that do not manufacture the host device 100. Since the charge injection timing interval is constant, there is no distortion in tracking even when the sampling window of digitizer is shorter than the timing interval T (undersampling condition).

The ripple problem is aggravated by the $T_X$ mode distortion and therefore can be explained by running open loop in the $T_X$ mode.

The CSAC architecture, may provide the best results and largely overcomes all the weaknesses of the previously discussed architectures, such as the VSA architecture. The proposed architectures can thus help remove and/or overcome the "ripple" affect found due to the interaction of the active stylus pen 206 and the host device. The apparatus and methods described herein can be used to overcome the last active stylus pen induced contributors to the ripple problem.

Embodiments of the disclosure may provide a non-transitory computer-readable medium storing program instructions that, when executed by a processing unit of a stylus, which is configured to interact with a touch sensing device, cause the processing unit to perform the steps of: receiving a capacitive sensing signal from the touch sensing device, wherein the received capacitive sensing signal is received during a cyclical scan of a touch sensing surface performed by the touch sensing device, and comprises a first data set collected over a first time interval of the cyclical scan and a second data set collected over a second time interval of the cyclical scan; comparing a first data set and the second data set to determine if the magnitude of the capacitive sensing signal in the first data set is different than the magnitude of the capacitive sensing signal in the second data set; and generating a voltage differential resulting in the accumulated charge differential at a tip to the stylus during the first time interval when the comparison determines that the magnitude of the capacitive sensing signal in the first data set is different than the capacitive sensing signal of the second data set during a previous cyclical scan.

It should be noted that any recitation of "a," "an," or "the" is intended to mean "one or more" unless specifically indicated to the contrary.

It is also understood that the examples and embodiments described herein are for illustrative purposes only and that various modifications or changes in light thereof will be suggested to persons skilled in the art and are to be included within the spirit and purview of this application and scope of the appended claims. Therefore, the above description should not be understood as limiting the scope of the invention as defined by the claims.

The invention claimed is:

1. A stylus adapted for use with a touch sensing device, comprising:
   a conductive tip;
   a memory unit configured to store a first data set and a second data set, wherein the first data set comprises information about a first capacitive sensing process that is performed by a first type of touch sensing device and the second data set comprises information about a second capacitive sensing process that is performed by a second type of touch sensing device;
   a controller configured to compare capacitive sensing signal data received from a touch sensing device with the first data set and the second data set; and
   a generator assembly configured to deliver a capacitive sensing controlling signal to the conductive tip, wherein the capacitive sensing controlling signal is derived from the comparison of the received capacitive sensing signal data with the first data set performed by the controller.

2. The stylus of claim 1, further comprising:
   an amplifier having an input and an output;
   a controlling capacitor coupled in series between the conductive tip and the input of the amplifier; and
   two or more comparators that are coupled to the output of the amplifier,
   wherein the controller is further configured to receive data from each of the two or more comparators.

3. The stylus of claim 2, further comprising a non-transitory computer-readable medium storing program instructions that, when executed by a processing unit of the stylus that is configured to interact with the touch sensing device, cause the processing unit to perform the steps of:
   receiving capacitive sensing signal during a cyclical scan of a touch sensing surface performed by the touch sensing device, wherein the received capacitive sensing signal is received at a first input of the controlling capacitor;
   detecting the amplitude of the received capacitive sensing signal using a detection process, wherein the detection process comprises:
   (a) connecting the amplifier input side of the controlling capacitor to ground for a first period of time;
   (b) disconnecting the amplifier input side of the controlling capacitor from ground for a second period of time;
   (c) measuring a voltage formed on the amplifier input side of the capacitor by use of the amplifier; and
   (d) repeating steps (a), (b) and (c) at least two times during a cycle of the cyclical scan process performed by the touch sensing device;
   determining a time during a cycle of the cyclical scan process performed by the touch sensing device a first measured voltage is greater than a second measured voltage, wherein the first and the second measured voltages are each determined during different second periods of time during the cycle of the cyclical scan process; and
   generating voltage at the conductive tip when the determined time during a cycle of the cyclical scan process occurs.

4. The stylus of claim 1, further comprising:
   an amplifier having an input and an output;
   a controlling capacitor coupled in series between the conductive tip and the input of the amplifier;
   a drive switching device having an output connection that is electrically coupled to an electrical connection formed between the conductive tip and the controlling capacitor, and the output connection is configured to be electrically coupled to one of a plurality of connection points, wherein the plurality of connection points comprise:
   a first connection point that is coupled to a resistive element that is coupled to a ground; and
   a second connection point that is coupled to a first drive voltage source,
   wherein the controller further comprises one or more data inputs that are configured to receive a signal delivered from the output of the amplifier.

5. A stylus adapted for use with a touch sensing device, comprising:
   a conductive tip;
   a memory unit configured to store a first data set, wherein the first data set comprises information relating to a capacitive sensing process that is performed by at least one type of touch sensing device;
   a controller configured to compare capacitive sensing signal data received from a touch sensing device with the first data set; and
   a generator assembly configured to deliver a capacitive sensing controlling signal to the conductive tip, wherein the capacitive sensing controlling signal is derived from the comparison of the received capacitive sensing signal data and the first data set performed,
   wherein the memory unit is configured to store program instructions that, when executed by a processing unit of the stylus cause the processing unit to perform the steps of:
   receiving the capacitive sensing signal data from the touch sensing device, wherein the received capacitive sensing signal is received during a cyclical scan of a touch sensing surface performed by the touch sensing device, and the capacitive sensing signal data comprises the first data set, which is collected over a first time interval of the cyclical scan, and a second data set collected over a second time interval of the cyclical scan;
   comparing the first data set and the second data set to determine if the magnitude of the capacitive sensing signal in the first data set is different than the magnitude of the capacitive sensing signal in the second data set; and generating a voltage at the conductive tip during the first time interval when the comparison determines that the magnitude of the capacitive sensing signal in the first data set is different than the magnitude of the capacitive sensing signal of the second data set during a previous cyclical scan.

6. A stylus adapted for use with a touch sensing device, comprising:
   a conductive tip;
   an amplifier having an input and an output;
   a controlling capacitor coupled in series between the conductive tip and the input of the amplifier;
   two or more comparators that are coupled to the output of the amplifier;
   a controller configured to receive data from each of the two or more comparators; and
   a switching device electrically connected between a ground and a portion of an electrical connection formed between the controlling capacitor and the input of the amplifier.

7. The stylus of claim 6, further comprising a drive switching device having an output that is electrically coupled to an electrical connection formed between the conductive tip and the controlling capacitor, wherein the drive switching device comprises:
   a first connection point that is coupled to a resistive element that is coupled to a ground; and
   a second connection point that is coupled to a first drive voltage source, wherein the drive switching device is configured to selectively connect the output to either the first connection point or the second connection point.

8. The stylus of claim 6, further comprising:
   a voltage source coupled to the conductive tip; and
   an oscillator coupled to the voltage source.

9. The stylus of claim 6, wherein the two or more comparators further comprise:
   a first comparator having a first input and a second input, wherein the first input is coupled to the output of amplifier,
   a second comparator having a first input and a second input, wherein the first input is coupled to the output of amplifier, and
   the stylus further comprises:
   a first threshold voltage source that is coupled to the second input of the first comparator; and
   a second threshold voltage source that is coupled to the second input of the second comparator.

10. The stylus of claim 6, wherein a capacitive sensing signal is received by the conductive tip.

11. The stylus of claim 6, further comprising:
   a memory unit configured to store a first data set, wherein the first data set comprises information relating to a capacitive sensing process that is performed by at least one type of touch sensing device, wherein the controller is further configured to compare the capacitive sensing signal with the first data set; and
   a drive voltage source configured to deliver a capacitive sensing controlling signal to the conductive tip, wherein the capacitive sensing controlling signal is derived from the comparison of the received capacitive sensing signal and the first data set performed by the controller.

12. The stylus of claim 6, further comprising:
   a communication unit that is configured to transmit data to the touch sensing device using a wireless communication method.

13. A stylus adapted for use with a touch sensing device, comprising:
   a conductive tip;
   an amplifier having an input and an output;
   a controlling capacitor coupled in series between the conductive tip and the input of the amplifier;
   a drive switching device having an output connection that is electrically coupled to an electrical connection formed between the conductive tip and the controlling capacitor, and the output connection is configured to be electrically coupled to one of a plurality of connection points, wherein the plurality of connection points comprise:
      a first connection point that is coupled to a resistive element that is coupled to a ground; and
      a second connection point that is coupled to a first drive voltage source; and
   a controller having one or more data inputs that are configured to receive a signal delivered from the output of the amplifier.

14. The stylus of claim 13, further comprising an input switching device electrically connected between the ground and a portion of an electrical connection formed between the controlling capacitor and the input of the amplifier.

15. The stylus of claim 13, further comprising:
   two or more comparators that are coupled to the output of amplifier and to the one or more data inputs of the controller.

16. The stylus of claim 15, wherein
   the two or more comparators further comprise:
      a first comparator having a first input and a second input, wherein the first input is coupled to the output of amplifier,
      a second comparator having a first input and a second input, wherein the first input is coupled to the output of amplifier, and
   the stylus further comprises:
      a first threshold voltage source that is coupled to the second input of the first comparator; and
      a second threshold voltage source that is coupled to the second input of the second comparator.

17. The stylus of claim 13, further comprising:
   a memory unit configured to store a first data set, wherein the first data set comprises information relating to a capacitive sensing process that is performed by at least one type of touch sensing device, wherein the controller is further configured to compare the capacitive sensing signal with the first data set; and
   a generator assembly configured to deliver a capacitive sensing controlling signal to the conductive tip, wherein the capacitive sensing controlling signal is derived from the comparison of the received capacitive sensing signal and the first data set performed by the controller.

18. The stylus of claim 13, further comprising:
   a communication unit that is configured to transmit data to the touch sensing device using a wireless communication method.

19. The stylus of claim 13, further comprising a non-transitory computer-readable medium storing program instructions that, when executed by a processing unit of the stylus that is configured to interact with the touch sensing device, cause the processing unit to perform the steps of:
   receiving capacitive sensing signal during a cyclical scan of a touch sensing surface performed by the touch sensing device, wherein the received capacitive sensing signal is received at a first input of the controlling capacitor;

detecting the amplitude of the received capacitive sensing signal using a detection process, wherein the detection process comprises:
  (a) connecting the amplifier input side of the controlling capacitor to ground for a first period of time;
  (b) disconnecting the amplifier input side of the controlling capacitor from ground for a second period of time;
  (c) measuring a voltage formed on the amplifier input side of the capacitor by use of the amplifier; and
  (d) repeating steps (a), (b) and (c) at least two times during a cycle of the cyclical scan process performed by the touch sensing device;

determining a time during a cycle of the cyclical scan process performed by the touch sensing device a first measured voltage is greater than a second measured voltage, wherein the first and the second measured voltages are each determined during different second periods of time during the cycle of the cyclical scan process; and generating voltage at the conductive tip when the determined time during a cycle of the cyclical scan process occurs.

* * * * *